United States Patent [19]

Tachibana

[11] Patent Number: 5,488,407
[45] Date of Patent: Jan. 30, 1996

[54] IMAGE RECORDING APPARATUS

[75] Inventor: Shunichi Tachibana, Urayasu, Japan

[73] Assignee: Canon Kabushiki Kaisha, Tokyo, Japan

[21] Appl. No.: 419,529

[22] Filed: Apr. 10, 1995

Related U.S. Application Data

[63] Continuation of Ser. No. 320,553, Oct. 11, 1994, which is a continuation of Ser. No. 212,649, Mar. 14, 1994, abandoned, which is a continuation of Ser. No. 97,227, Jul. 27, 1993, abandoned.

[30] Foreign Application Priority Data

Jul. 28, 1992 [JP] Japan ................................. 4-201159
Jul. 9, 1993 [JP] Japan ................................. 5-170027

[51] Int. Cl.⁶ ..................................................... H04N 1/21
[52] U.S. Cl. ............................................. 347/264; 346/134
[58] Field of Search ................................. 347/264, 262, 347/218, 164; 346/134

[56] References Cited

U.S. PATENT DOCUMENTS

| | | | |
|---|---|---|---|
| 3,958,224 | 5/1976 | Boyd et al. | 340/172.5 |
| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | 7/1984 | Ayata et al. | 346/1.1 |

(List continued on next page.)

FOREIGN PATENT DOCUMENTS

| | | |
|---|---|---|
| 2416232 | 2/1975 | Germany . |
| 59-123670 | 7/1984 | Japan . |
| 59-138461 | 8/1984 | Japan . |
| 61-273980 | 12/1986 | Japan . |
| 62-132653 | 6/1987 | Japan . |
| 63-111078 | 5/1988 | Japan . |
| 2-190372 | 7/1990 | Japan . |
| 2-209283 | 8/1990 | Japan . |
| 2-221814 | 9/1990 | Japan . |

OTHER PUBLICATIONS

Patent Abstracts of Japan, vol. 11, No. 135 (M–585), Apr. 28, 1987.
Patent Abstracts of Japan, vol. 14, No. 525 (P–1132), Nov. 19, 1990.
Patent Abstracts of Japan, vol. 14, No. 506 (M–1044), Nov. 1990.
Patent Abstracts of Japan, vol. 14, No. 473 (M–1035), Oct. 16, 1990.
Patent Abstracts of Japan, vol. 11, No. 352 (M–643), Nov. 18, 1987.
Patent Abstracts of Japan, vol. 12, No. 352 (M–744), Sep. 21, 1988.

*Primary Examiner*—Mark J. Reinhart
*Attorney, Agent, or Firm*—Fitzpatrick, Cella, Harper & Scinto

[57] ABSTRACT

A recording head having a plurality of recording elements arranged thereon is moved in a different direction than a direction of arrangement to make record scan and a recording sheet is fed by a distance corresponding to a recording width of the recording head for each scan. The record scan (main scan) and the sheet feed (sub-scan) are repeated to record received image data on the recording sheet. The feed amount of the recording sheet is counted, and the data is sent to a recording unit until the count reaches a predetermined count, that is, the data a predetermined amount before a trailing edge of the recording sheet is sent, without synchronization with the operation of the recording unit. Thereafter, when the recording of the sent-out data is completed, the remaining data is sent for each record scan in synchronism with the operation of the recording unit During the period other than the recording operation period, the detection of the trailing edge of the recording sheet is monitored by a sensor provided before a recording position. When the trailing edge of the recording sheet is detected, whether the remaining data is recordable or not is determined bases on the count, and if it is recordable, the process is continued and if it is not recordable the renewal of page is made.

31 Claims, 26 Drawing Sheets

U.S. PATENT DOCUMENTS

| | | | |
|---|---|---|---|
| 4,558,333 | 12/1985 | Sugitani et al. | 346/140 |
| 4,723,129 | 2/1988 | Endo et al. | 346/1.1 |
| 4,740,796 | 4/1988 | Endo et al. | 346/1.1 |
| 4,814,792 | 3/1989 | Yamanobe et al. | 346/108 |
| 4,888,602 | 12/1989 | Watanabe | 346/134 |
| 5,132,711 | 7/1992 | Shinada et al. | 346/140 |
| 5,175,566 | 12/1992 | Ejiri et al. | 346/140 |
| 5,229,792 | 7/1993 | Ono et al. | 346/140 |

IMAGE RECORDING APPARATUS

This application is a continuation of application Ser. No. 08/320,553 filed Oct. 11, 1994, which is a continuation of application Ser. No. 08/212,649 filed Mar. 14, 1994, abandoned, which is a continuation of application Ser. No. 08/097,227 filed Jul. 27, 1993, abandoned.

BACKGROUND OF THE INVENTION

1. Field of the Invention

The present invention relates to an image recording apparatus for recording an image in accordance with image data.

2. Related Background Art

In a prior art facsimile apparatus, when a printer unit is used in a recording unit, one page of recordable area of the facsimile is determined by the printer unit. That is, the printer unit itself detects a trailing edge of a record sheet, and when it detects the trailing edge, renewal of page is immediately executed without regard to a status of the image data being recorded.

When a printer unit such as a line printer which has no concept of page is used in the prior art apparatus, the renewal of page may be made while a large blank is left in a trailing edge of the record sheet or the renewal of page is made while it is not desired. Thus, control is not well attained.

In a printer unit which has no interface to transmit an operation status of the printer to the external, it is not known from the external whether the recording has been surely done or not. Accordingly, it cannot be used for a facsimile apparatus which needs to surely record a received image. For those reasons, a recording unit which is exclusively designed for the facsimile apparatus and which is expensive in cost has been used for the facsimile apparatus.

SUMMARY OF THE INVENTION

It is an object of the present invention to provide an improved image recording apparatus in the light of the above.

It is another object of the present invention to provide an image processing apparatus which can properly record an image on a recording medium without failure.

It is still another object of the present invention to provide an image processing apparatus which can surely record an image up to a predetermined position in a trailing edge area of the recording medium.

It is still another object of the present invention to provide an image processing apparatus which can execute the renewal of page at a proper position.

It is still another object of the present invention to provide an image processing apparatus which records an image at a proper position on a recording medium by controlling a recording unit by detecting the position of the recording medium by a communication control unit.

The above and other objects of the present invention will be apparent from the accompanying drawings and the following description.

DETAILED DESCRIPTION OF THE PREFERRED EMBODIMENTS

The preferred embodiments of the present invention are now explained with reference to the accompanying drawings.

EMBODIMENT 1

Figure 1:
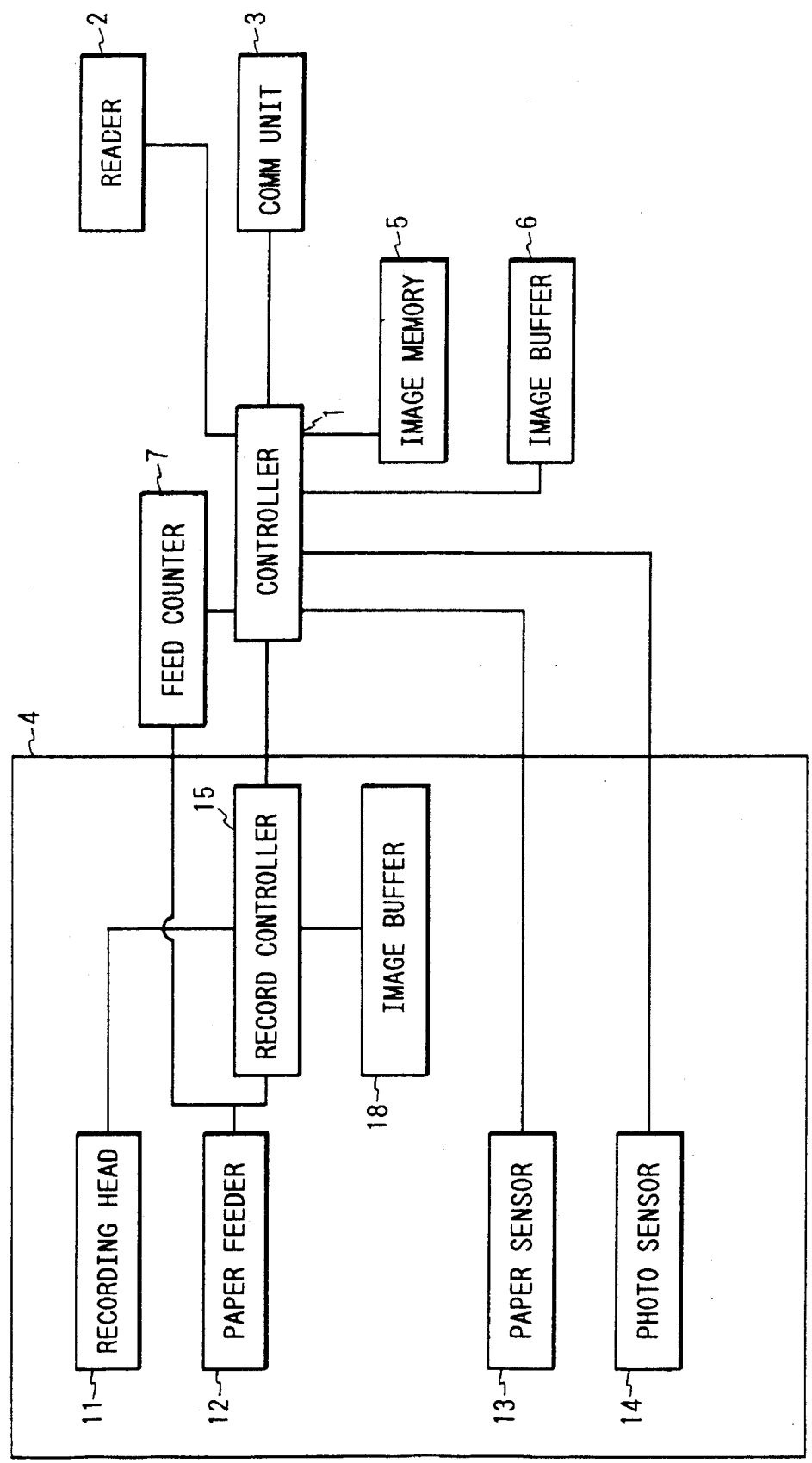
FIG. 1 shows a block diagram of a configuration of a facsimile apparatus in an embodiment of the present invention.

FIG. 1 shows a block diagram of a configuration of a facsimile apparatus in accordance with the present embodiment. In FIG. 1, numeral 1 denotes a control unit which controls an entire facsimile apparatus. The control unit 1 comprises a CPU 1*a*, a ROM 1*b* and a RAM 1*c*. The CPU 1*a* executes control programs stored in the ROM 1*b* to control the facsimile apparatus. Various control programs such as those shown in flow charts to be explained later are stored in the ROM 1b. The RAM 1c has a memory area for temporarily storing data for the CPU 1a to execute the processing.

Numeral 2 denotes a reader unit which reads an image of a document sheet to generate image data and transfers it to the control unit 1. Numeral 3 denotes a communication unit which includes a modem circuit and a network control circuit and is connected to a line to transmit and receive data to and from an external facsimile apparatus. Numeral 5 denotes an image memory which stores received image data. Numeral 6 denotes an image buffer which temporarily stores image data produced by converting image data read from the image memory in accordance with a resolution of the recording unit 4. The image buffer 6 has a capacity corresponding to an area which the recording unit 11 can draw in one main scan movement. Numeral 7 denotes a feed amount counter unit which counts the feed amount of a record sheet and issues an interruption signal to the CPU 1a when a predetermined feed amount is attained.

Figure 2:
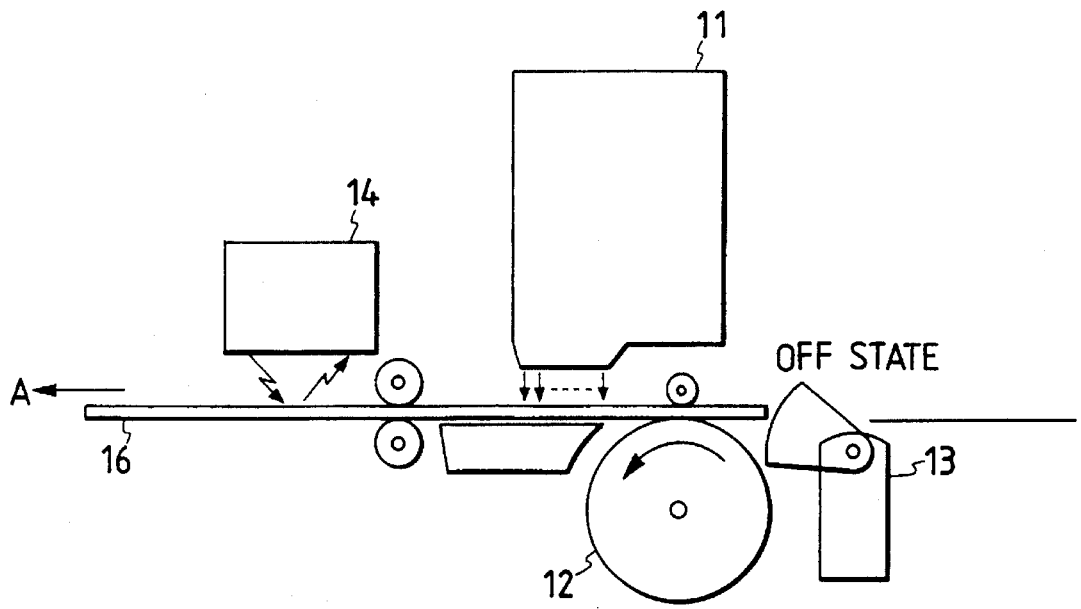
FIG. 2 shows a configuration of a recording unit of the embodiment.

A detail of the recording unit 4 is now explained with reference to FIGS. 2 and 3. FIG. 2 shows a configuration of a recording unit of the present embodiment.

Numeral 11 denotes a recording head which has ink droplet discharging nozzles of a 64-dot line at a density of 360 dpi along a sub-scan direction (arrow A). In the present embodiment, the ink droplet is discharged from the nozzle by causing a status change in the ink by using a thermal energy generated by an electro-thermal conversion device provided for each nozzle. The recording head 11 records data on a recording sheet at a recording density of 360 dpi while it is moved in a main scan direction (normal to the plane of the drawing, an arrow B in FIG. 3). In this manner, the image is recorded at a recording density of 360 dpi×360 dpi. Numeral 12 denotes a record sheet feed unit which feeds and ejects a record sheet and transport the record sheet at a precision of 360 dpi to position it along the sub-scan direction when recording is made by the recording unit 11. Numeral 13 denotes a recording sheet sensor which is in an ON state when a recording sheet 16 is present, and in an OFF state when the recording sheet 16 is not present to detect the presence or absence of the recording sheet and a leading edge and a trailing edge of the recording sheet. Numeral 14 denotes a reflection type photosensor which detects an image density on a recording plane of the recording sheet 16. Numeral 15 denotes a record control unit which controls the recording unit 11, the recording sheet feed unit 12 and the recording sheet sensor 13 in accordance with a command of control data sent form the CPU 1a. Numeral 16 denotes a recording sheet on which an image is recorded. Numeral 18 denotes an image buffer of the recording unit which stores image data for each scan and a line feed command.

Figure 3:
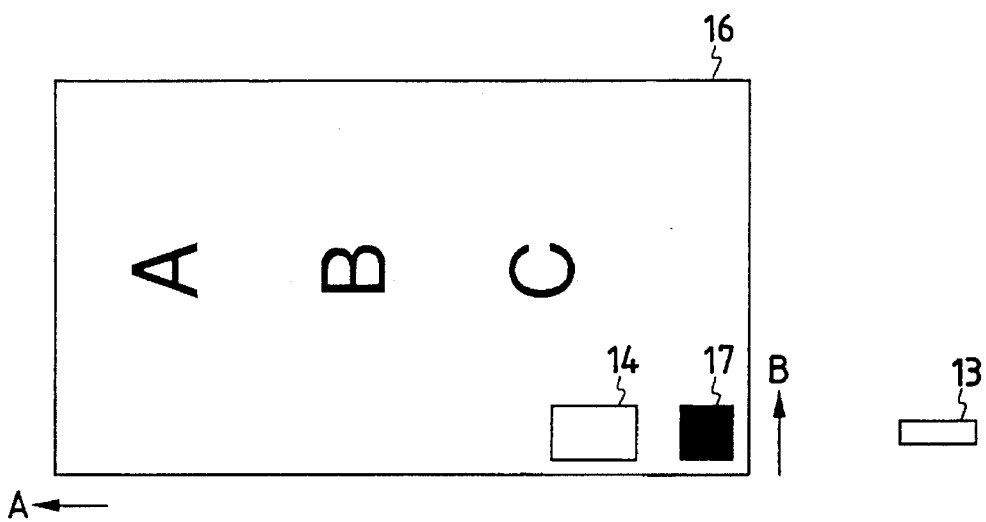
FIG. 3 shows a positional relation between a record sheet sensor and a photo-sensor.

FIG. 3 shows a positional relation between the recording sheet sensor 13 and the photo-sensor 14 and numeral 17 shows a footer mark and a record position thereof to be explained later. The sensors 13 and 14 and the mark 17 are arranged to be aligned along the transport direction (direction A) of the recording sheet. They are located at a leftmost end of a recordable area of the recording unit 11 to the recording sheet 11.

Figure 4:
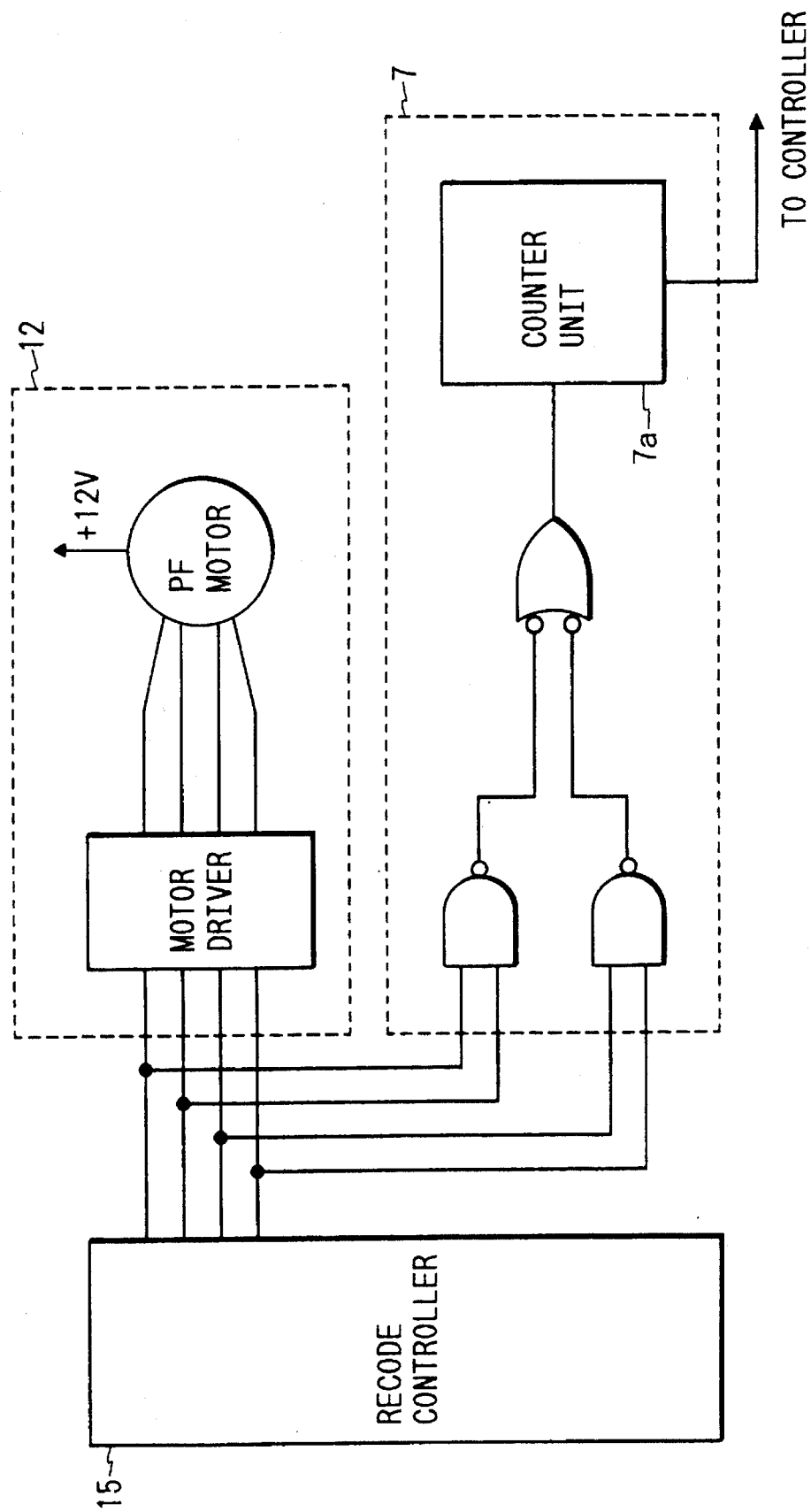
FIG. 4 shows a block diagram of a configuration of a record sheet feed amount counter unit.

FIG. 4 shows a block diagram of a configuration of the recording sheet feed amount counter unit 7. The recording sheet feed amount counter unit 7 is a circuit for counting pulses of a PF motor which is a motor of the recording sheet feed unit. Pulses sent to a driver of the PF motor from the record control unit 15 are applied to a counter unit 7a which latches a preset initial value by a first pulse and is subsequently decremented by one for each input pulse. When the counter reached zero, the output port is rendered high. This output port is connected to an interruption terminal of the CPU 1a.

A recording operation of the facsimile apparatus of the embodiment 1 configured as described above is now explained.

Figure 5:
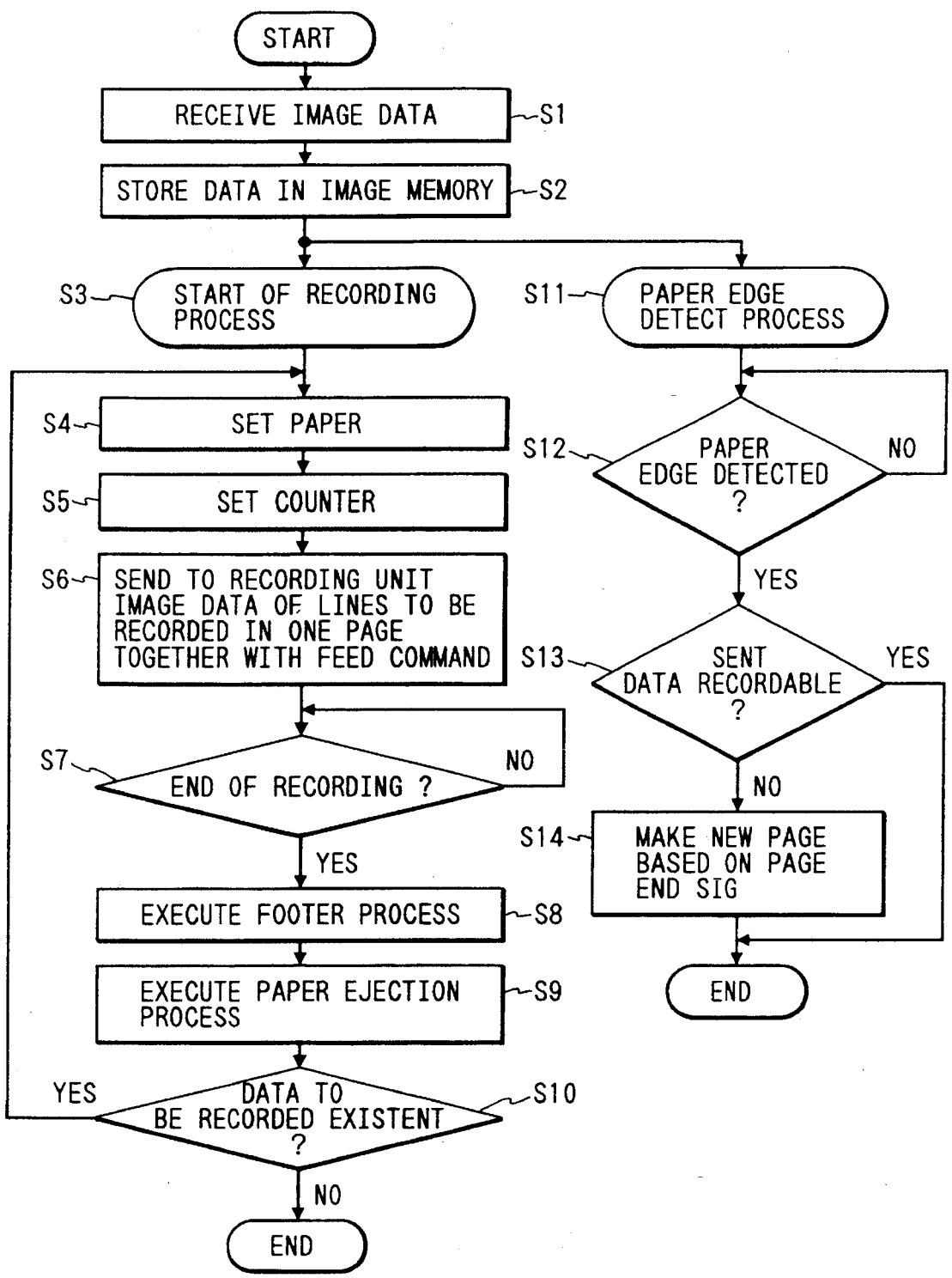
FIG. 5 shows a flow chart of a record operation of a facsimile apparatus in an embodiment 1.
Figure 6:
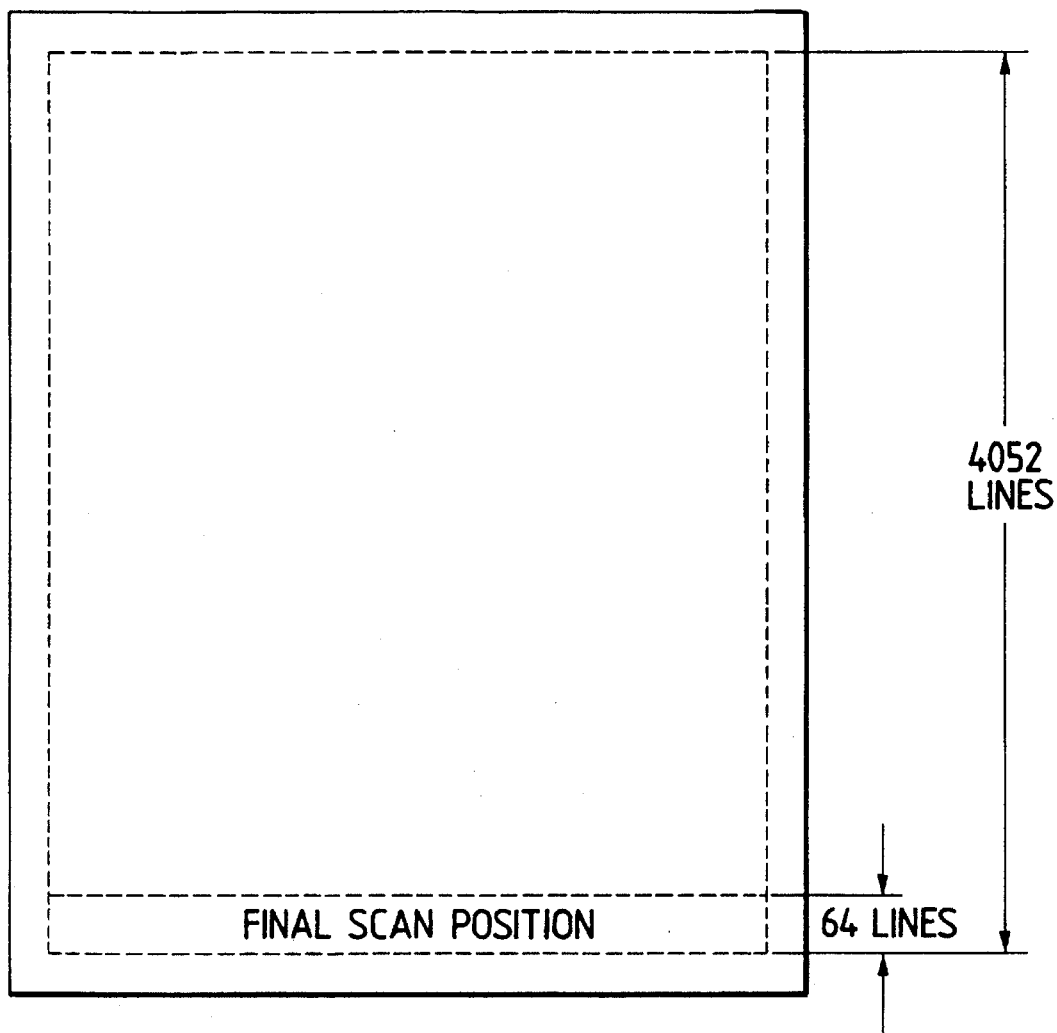
FIG. 6 shows a record operation of the facsimile apparatus of the embodiment 1.

A general operation of the recording operation of the facsimile apparatus is first explained with reference to FIGS. 5 and 6. FIG. 5 shows a flow chart of the recording operation of the facsimile apparatus of the embodiment 1. FIG. 6 shows the recording operation of the facsimile apparatus of the embodiment 1.

In FIG. 5, when the communication unit 3 receives image data in a step S1, the received data is stored in the image memory 5 in a step S2. When the image data is stored in the image memory 5, the recording operation is started in a step S3. In a step S4, queuing of the recording sheet 16 is effected to set the recording sheet at a predetermined position. In a step S5, count data is set in the counter unit 7a so that interruption is issued to the CPU 1a of the control unit 1 when the recording head reaches the last scan line position. In a step S6, image data of a number of lines which can be recorded in one page is developed into image data and it is sent to the recording unit 4 as data having scan data and a feed command.

Referring to FIG. 6, the number of lines which can be recorded on the recording sheet is 4052. Since 1 scan=64 lines, it is necessary to conduct 3988 line feeding in order to position the recording head at the last scan position. Accordingly, 3987 is set in the counter unit 7a. The value set in the counter unit 7a is equal to 3988−1 because one pulse is used to set the data in the counter unit 7a.

In a step S7, the completion of the recording of the image data sent by the recording unit 4 in the step S6 is monitored. The completion of the recording can be detected by the issuance of an interruption signal from the counter unit 7a. When the interruption signal is issued, the recording head 11 is at the last scan line position and it prints out the footer mark in a step S8. In a step S9, the sheet ejection process is conducted to eject the printed recording sheet 16. In a step S10, whether data to be recorded is left or not is determined, and if it is left, the process returns to the step S4. If it is not left, the process is terminated.

In the recording process of the steps S3–S10, recording sheet edge detection process (steps S11–S14) is conducted. In a step S12, the recording sheet sensor 13 is monitored to detect the trailing edge of the recording sheet 16. When the trailing edge of the recording sheet is detected in a step S12, the process proceeds to a step S13. In the step S13, whether the image data sent in the step S6 can be recorded in the recording sheet or not is determined.

By a structure of the recording unit 4, two more scans of recording can be made after the detection of the trailing edge of the recording sheet by the recording sheet sensor 13. Accordingly, if the content of the counter unit 7a is no larger than 64 when the trailing edge of the recording sheet is detected, all of the sent-out data can be recorded. If the decision in the step S13 indicates that the data is recordable, the process is terminated. If the data is not recordable, the process proceeds to a step S14. In the step S14, a page end signal is sent to the recording unit 4 to conduct the renewal of page by the recording unit 4. Unrecorded data which has been sent to the recording unit 4 is recorded on a new page.

A more detailed control procedure for attaining the above operation is explained below.

Figures 7, 7A:
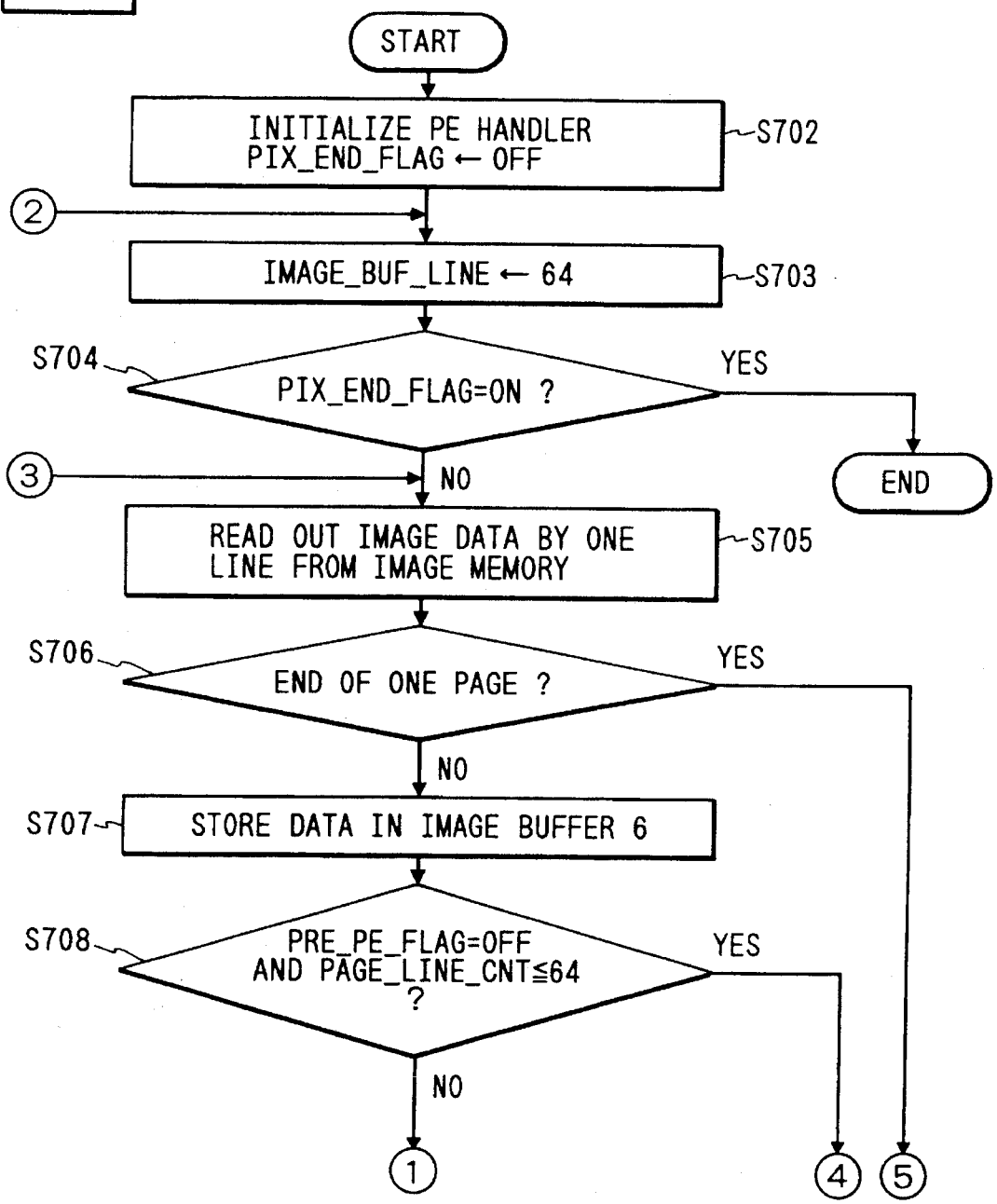
FIGS. 7, 7A and 7B contain FIGS. 7A and 7B showing flow charts of a recording process for recording one page of image stored in an image memory.

FIG. 7 shows a flow chart of a storing process for storing one page of image data stored in the image memory 5 in the present embodiment. It is executed by the CPU 1a.

In a step S702, queuing of the recording sheet is conducted and a PE handler initialization process is conducted to initialize flags and a counter. The PE handler controls the PE signal to the recording unit while it monitors the recording sheet edge sensor. The processing by the PE handler (FIG. 13) and the initialization process (FIG. 12) of the PE handler will be described later.

In a step S703, 64 is set in an image buffer line counter IMAGE_BUF_LINE. In a step S704, if a flag PIX_END_FLAG which indicates the end of one page of image data is ON, the process is terminated. If not, the process proceeds to a step S705 to read out one page of image data from the image memory 5. In the present embodiment, data is stored in the image memory 5 in an MR code and it is decoded and developed into raw image data. Since the decoding process is not directly related to the present invention, the explanation thereof is omitted. When the end (RTC) of one page of image is detected in a step S706, the process proceeds to a step S714. In the step S714, the PIX_END_FLAG is set to ON and the process proceeds to a step S715.

On the other hand, if the end of image is not detected, the process proceeds to a step S707 to store the developed image data in the image buffer 6. In the present embodiment, the raw line data having the resolution of 8 pels/mm read in the step S705 is converted to data having a resolution of 360 dpi and it is developed into the image buffer 6 having the memory capacity of 360 dots×64 lines data. A technique for converting the resolution is known and it is not directly related to the present invention. Accordingly, the explanation thereof is omitted.

In a step S708, if a PRE_PE_FLAG is OFF and a PAGE_LINE_CNT is no larger than 64, the PRE_PE_FLAG is set to ON in a step S713 and the process proceeds to a step S715. The PRE_PE_FLAG is set to ON when the content of the counter unit 7a is zero. Namely, it is set to ON when the number of remaining recordable lines is 64. In the step B708, if the PRE_PE_FLAG is ON or the PAGE_LINE_CNT which indicates the number of remaining recordable lines (to be described later) is no smaller than 64, the process proceeds to a step S709 to decrement an IMAGE_BUF_LINE which indicates the number of data lines stored in the image buffer 6 and the PAGE_LINE_CNT by one, respectively. In a step S710, if 64 lines of data has been stored in the image buffer 6 (the IMAGE_BUF_LINE is zero), the process proceeds to a step S711. On the other hand, if it is not yet full, the process returns to the step S705.

In the step S711, if the PRE_PE_FLAG is ON, a PE_FLAG is set to ON in a step S712 and the process proceeds to a step S715. The PE_FLAG indicates that 64 lines of data have been prepared after the PRE_PE_FLAG was set to ON, that is, the number of remaining recordable lines is zero. On the other hand, if the PRE_PE_FLAG is OFF in the step S711, the process proceeds to a step S715. In the step S715, the content of the image buffer 6 is sent to the recording unit and the process returns to the step S703. The recording process for one scan of data is explained below.

Figure 8:
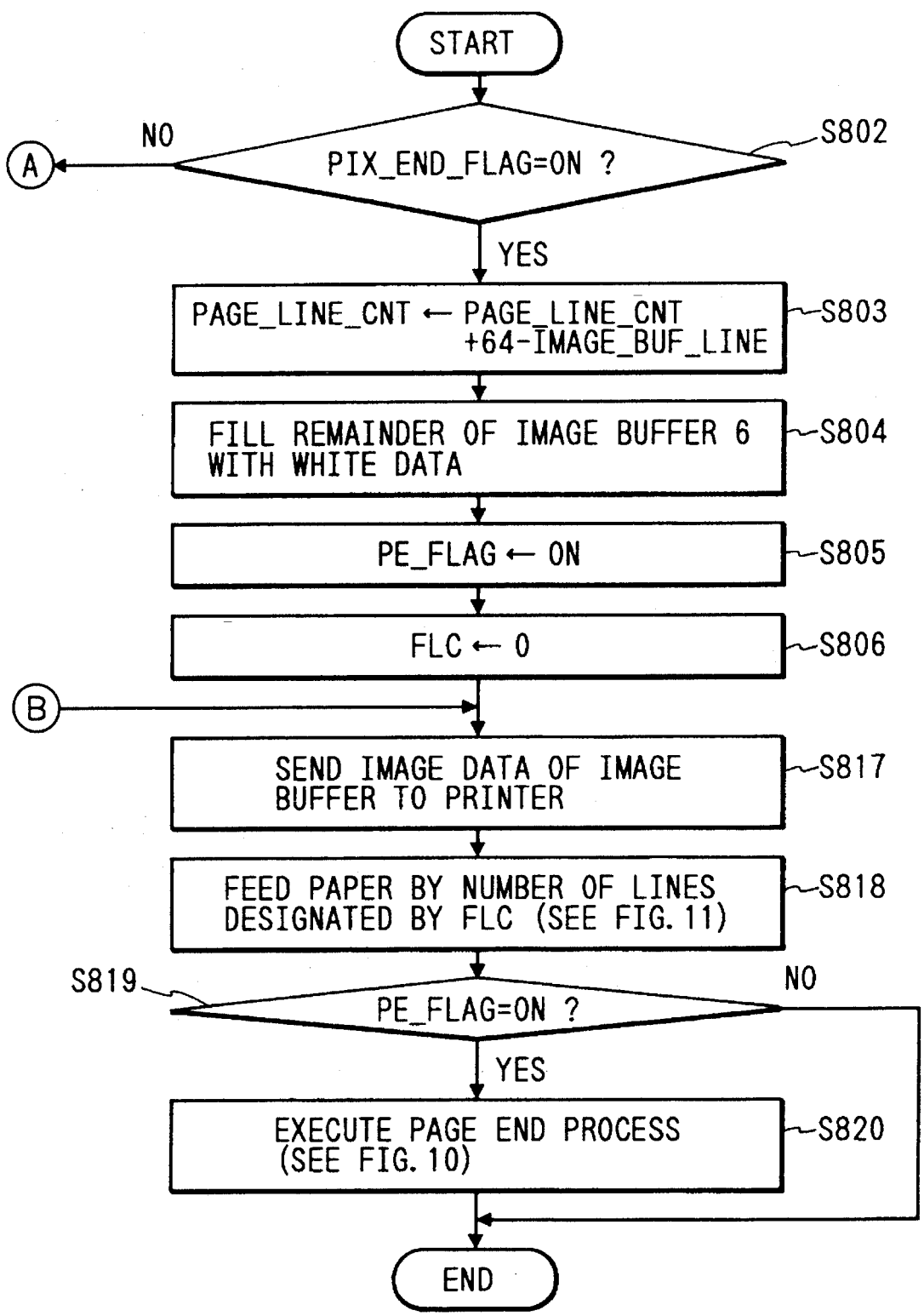
FIG. 8 shows a flow chart of detail of a portion of the recording process shown in FIGS. 7A and 7B.
Figure 9:
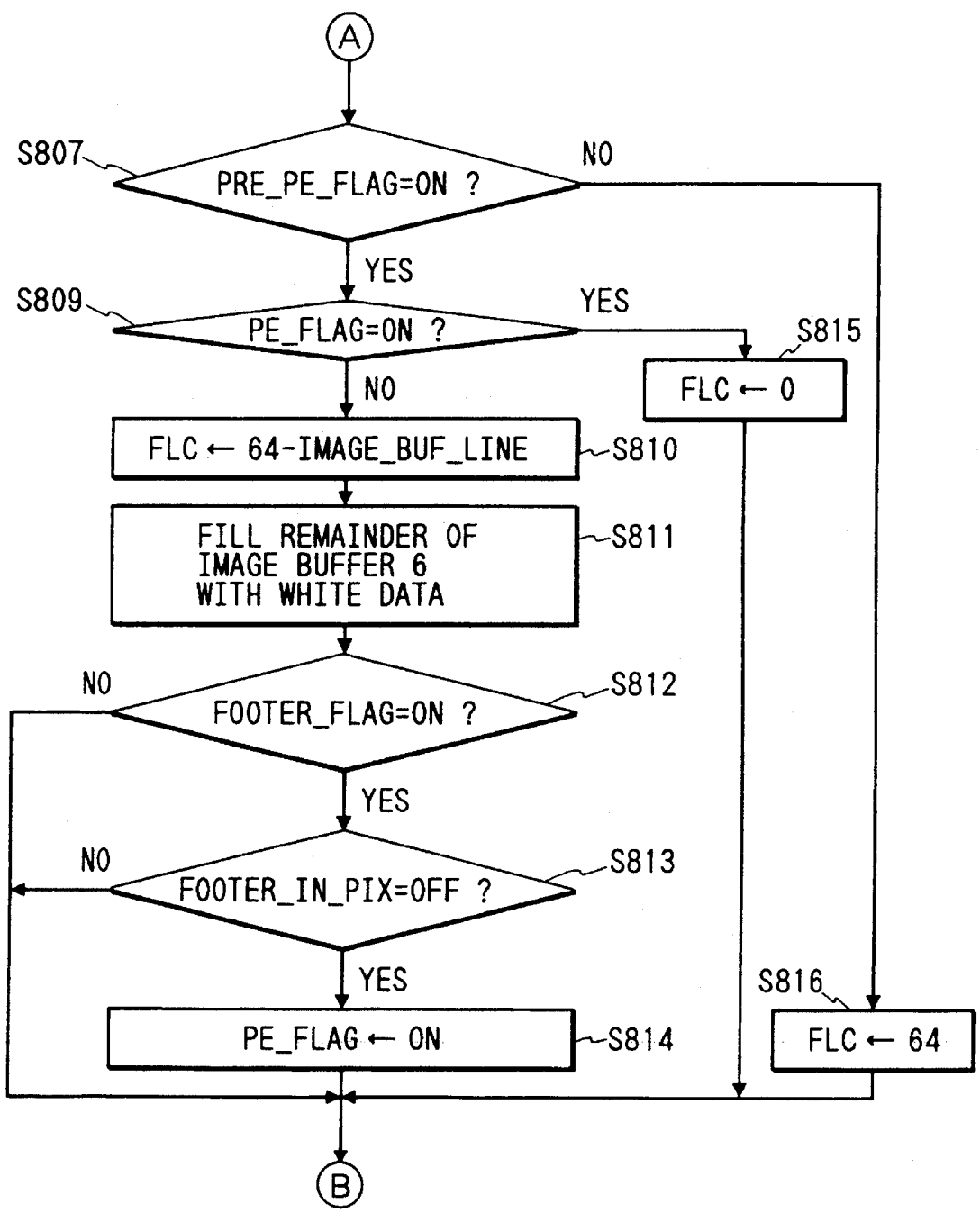
FIG. 9 shows a flow chart of detail of a portion of the recording process shown in FIGS. 7A and 7B.

FIGS. 8 and 9 show flow charts of detail of the process of the step S715.

In a step S802, if the PIX_END_FLAG is ON, that is, if the image has been completed, the number of remaining lines of the recording sheet under recording is set in a step S803. It is used for the positioning of the trailing edge of the recording sheet in the page ending process in a step S820. The PAGE_LINE_CNT indicates the number of remaining recordable lines. In order to feed the recording sheet by the number of recorded lines collectively at the time of the positioning of the recording sheet trailing edge, the feed amount of the recorded lines is set to zero (step S806) and it is added to the PAGE_LINE_CNT. In a step S804, the remaining area of the image buffer is filled with white. If the RTC is detected in the step S706 in the course of the process of the steps S705 to S708, the image data of the image buffer 6 is partially set. Accordingly, it is necessary to clear the remaining area of the image buffer 6 in the manner described above. In the step S805, the flag PE_FLAG which shows the end of record is set to ON, in a step S806, the number FLC of lines of feed is set to zero, and the process proceeds to a step S817.

On the other hand, if the PIX_END_FLAG is OFF in the step S802, the process proceeds to a step S807. In the step S807, if the PRE_PE_FLAG is ON, the process proceeds to a step S809. In the step S809, if the PE_FLAG is OFF, the process proceeds to a step S810 to set the number of prepared lines to the number of feed lines FLC (step S810) and fill the remaining area of the image buffer 6 with white (step S811), and the process proceeds to a step S812. When the PRE_PE_FLAG is ON and the PE_FLAG is OFF, it means that the number of remaining recordable lines is 64. If a FOOTER_FLAG is ON, that is, a footer print mode (step S812) and a FOOTER_IN_PIX is ON, that is, a mode to print the footer outside of the image (step S813), the PE_FLAG is set to ON in a step S814 and the process proceeds to a step S817. In the facsimile apparatus of the present embodiment, the footer is recorded in a reception mode and not recorded in a copy mode. Accordingly, the FOOTER_FLAG is ON in the reception mode. The FOOTER_IN_PIX indicates one of a mode to record the footer in the received image and a mode to record the footer outside of the received image. If the mode to record in the received image is selected, both the footer and the image are recorded in an area on the recording sheet in which the last scan line is to be recorded. When the mode to record outside of the received image is recorded, only the footer is recorded in the area in which the last scan line is to be recorded. The selection of the mode is done by a key entry of a console unit.

In the step S809, if the PE_FLAG is ON, the number of remaining recordable lines is zero and the recording sheet is to be ejected. Thus, the number of feed lines FLC is set to zero (step S815) and the process proceeds to a step S817.

If the PRE_PE_FLAG is OFF in the step S807, it means normal printing before the trailing edge of the recording sheet. Thus, the number of feed lines FLC is set to 64 (step S816) and the process proceeds to a step S817.

In the step S817, the image data of 360×64 dots formed in the image buffer 6 is sent to the recording unit.

Figure 11:
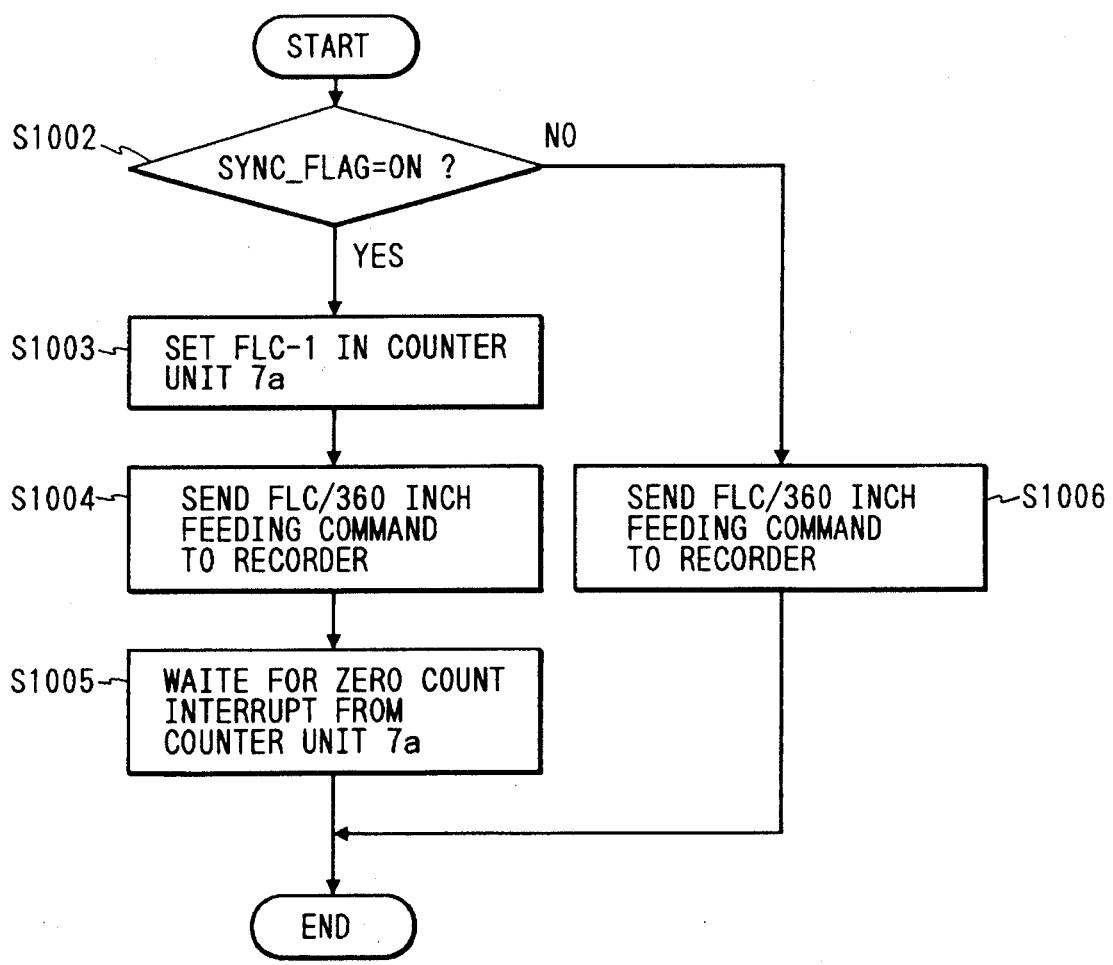
FIG. 11 shows a flow chart of a feed process.

In a step S818, a command to feed the recording sheet by the number of lines designated by the FLC is sent to the recording unit to set the recording sheet to the next recording position. Detail of this feed process will be explained later (FIG. 11).

In a step S819, if the PE_FLAG is ON, the page ending process to print the footer and eject the recording sheet is conducted in a step S820 and the process is terminated. If the PE_FLAG is OFF, the process is directly terminated. The page ending process will be explained later.

Figure 10:
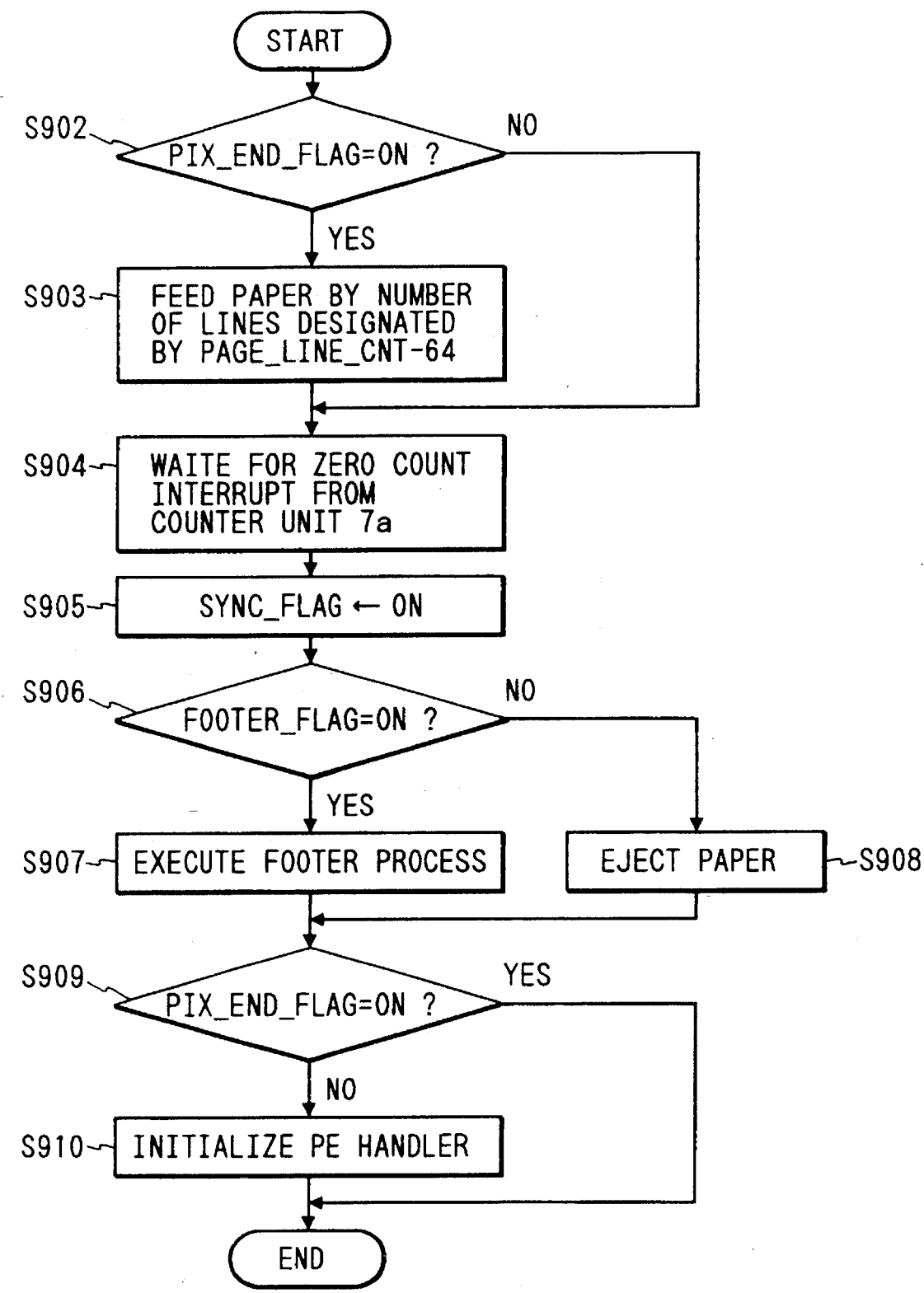
FIG. 10 shows a flow chart of a page ending process.

FIG. 10 shows a flow chart of the page ending process in a step S820 of FIG. 8.

In a step S902, if the PIX_END_FLAG is ON, the recording sheet is fed to the trailing edge in a step S903 and the process proceeds to a step S904. In the step S902, if the PIX_END_FLAG is OFF, the process directly proceeds to the step S904. In the step S904, an interruption signal from the counter unit 7a is monitored to monitor the completion of the image data sent to the recording unit 4. Since one page of lines have been set in the counter unit 7a during the initialization process of the PE handler (which will be explained later in connection with FIG. 12) at the start of recording, the completion of the record can be detected by the zero count interruption of the counter unit 7a.

In a step S905, a SYNC_FLAG which indicates a synchronization mode with the recording unit is set to ON, and if the FOOTER_FLAG is ON in a step S906, the process proceeds to a step S907, and if it is OFF, the process proceeds to a step S908. The footer process of the step S907 will be explained later with reference to FIGS. 7A, 7B and 8. The sheet ejection process of the step S908 will be explained later with reference to FIG. 17.

In a step S909, if the PIX_ENF_FLAG is ON, that is, there is no longer line to be recorded in the image under recording, the process is directly terminated. In the step S909, if the PIX_END_FLAG is off, that is, if there is a line to be recorded, the PE handler initialization process is conducted in a step S910 to queue the next recording sheet and initialize variables, and the process is terminated. The PE handler controls the PE signal to the recording unit 4 while it monitors the edge of the recording sheet by the recording sheet sensor 13. The processing of the PE handler (FIG. 13) and the initialization process of the PE handler (FIG. 12) will be explained later.

FIG. 11 shows a flow chart of the feed process in the step S818 of FIG. 8.

In a step S1102, if the SYNC_FLAG which indicates whether it is in the synchronization mode with the recording unit is ON, the process proceeds to a step S1003. In the step S1003, a value equal to the number of feed lines (FLC) minus 1 is set to the counter unit 7a (step S1004). Because one pulse is used to set the cont in the counter unit, 1 is minused from the FLC. After the constant has been set in the counter unit 7a, a command of FLC/360 inches feed is sent to the recording unit 4 (step S1005) and zero count interruption of the counter unit is monitored to monitor the completion of the feed of the recording unit (step S1005). In this manner, the synchronization with the recording unit is maintained. On the other hand, if the SYNC_FLAG is OFF in the step S1002, the FLC/360 feed command is sent to the recording unit 4 in a step S1006 and the process is terminated.

Figure 12:
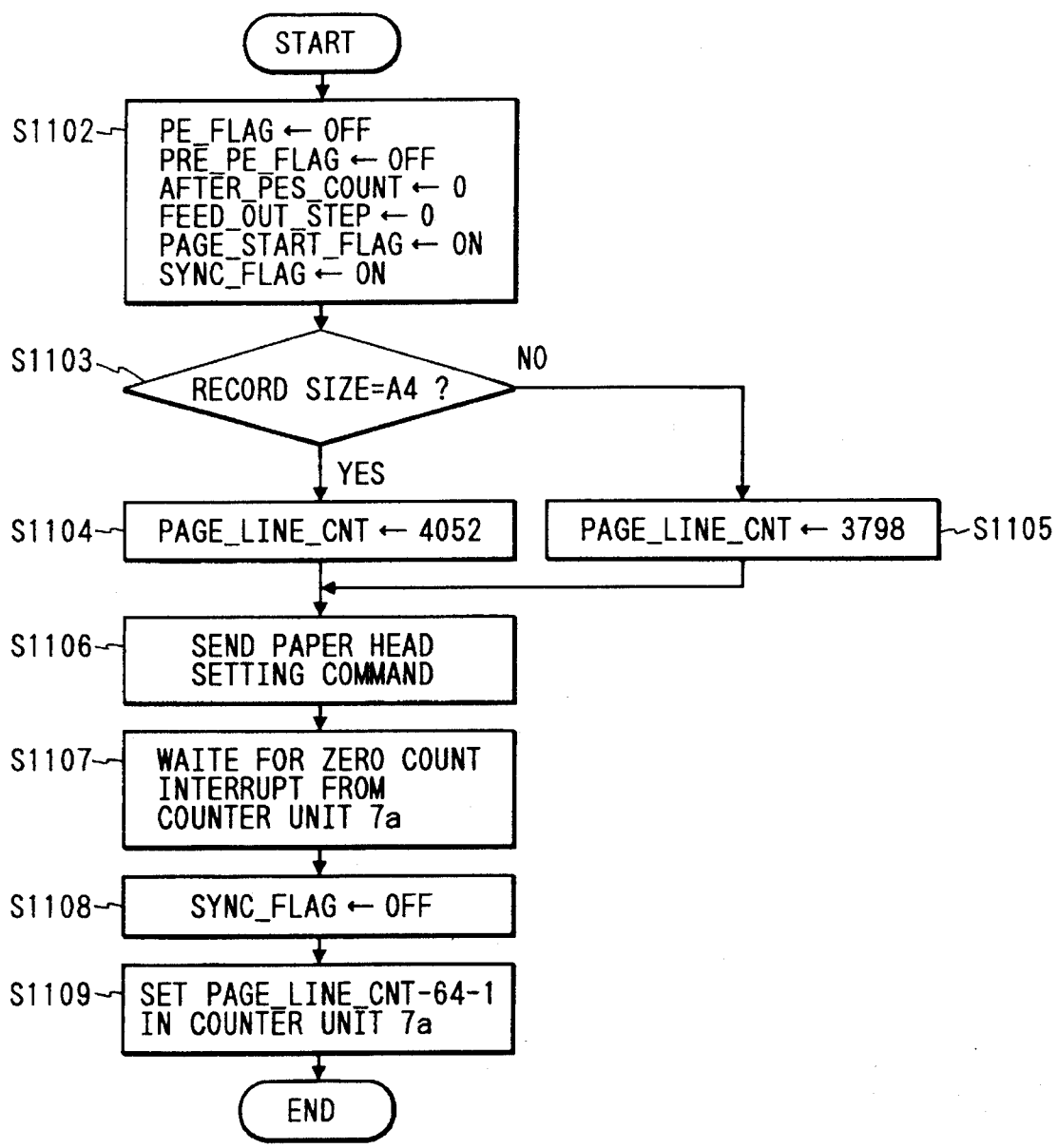
FIG. 12 shows a flow chart of an initialization process of a PE handler.

FIG. 12 shows a flow chart of the initialization process of the PE handler in the step S702 of FIG. 7A and the step S910 of FIG. 10.

In a step S1102, flags are initialized. The PE_FLAG which indicates that the number of remaining recordable lines is zero and the PRE_PE_FLAG which indicates that the number of remaining recordable lines is 64 (that is, one more scan of lines are recordable) are set to OFF. A buffer FEED_OUT_STEP which stores the feed amount from the end of the image to the trailing edge of the recording sheet is set to zero, and a flag PAGE_START_FLAG which indicates the start of queuing of the recording sheet and the flag SYNC_FLAG which indicates the synchronization mode with the recording unit are set to ON.

In a step S1103, a switch of the size of the recording sheet which is set by a user is checked, and if a size A4 recording sheet has been set, the process proceeds to a step S1104, and if a size LTR recording sheet has been set, the process proceeds to a step S1005. In the present embodiment, the number of recordable lines at the recording density of 360 dpi is 4052 lines for the size A4 recording sheet (step S1104), and 3798 lines for the size LTR recording sheet (step S1105). Those numbers of recordable lines are set in the PAGE_LINE_CNT.

Then, the queue command for the recording sheet is sent to the recording unit 4 (step S1106). In the present embodiment, a space command and a backspace command are sequentially sent to set the recording position at the left top corner of the recording sheet. In a step S1107, the completion of the queuing by the queue command is monitored. When the queuing is completed, an asynchronous mode with the recording unit 4 is initiated (step S1108) and a value equal to the number of lines of one page minus 65 is set in the counter unit 7a (step S1109) and the process is terminated. In the step S1109, 64 is minused because it is necessary to leave the last one scan of recordable lines in order to record the footer mark in the position of the last one scan, and 1 is further minused because the first pulse is used for the latch of the count register.

The ending process of the queuing in the step S1107 is conducted by the zero count interruption of the counter unit 7a. When the PE sensor detects the head of the recording sheet during the process by the PE handler to be explained in FIG. 13, the number of pulses from the PE sensor to the record start position is set to the counter unit 7a so that the end of queuing can be detected by the zero count interruption of the counter unit 7a.

Figure 13:
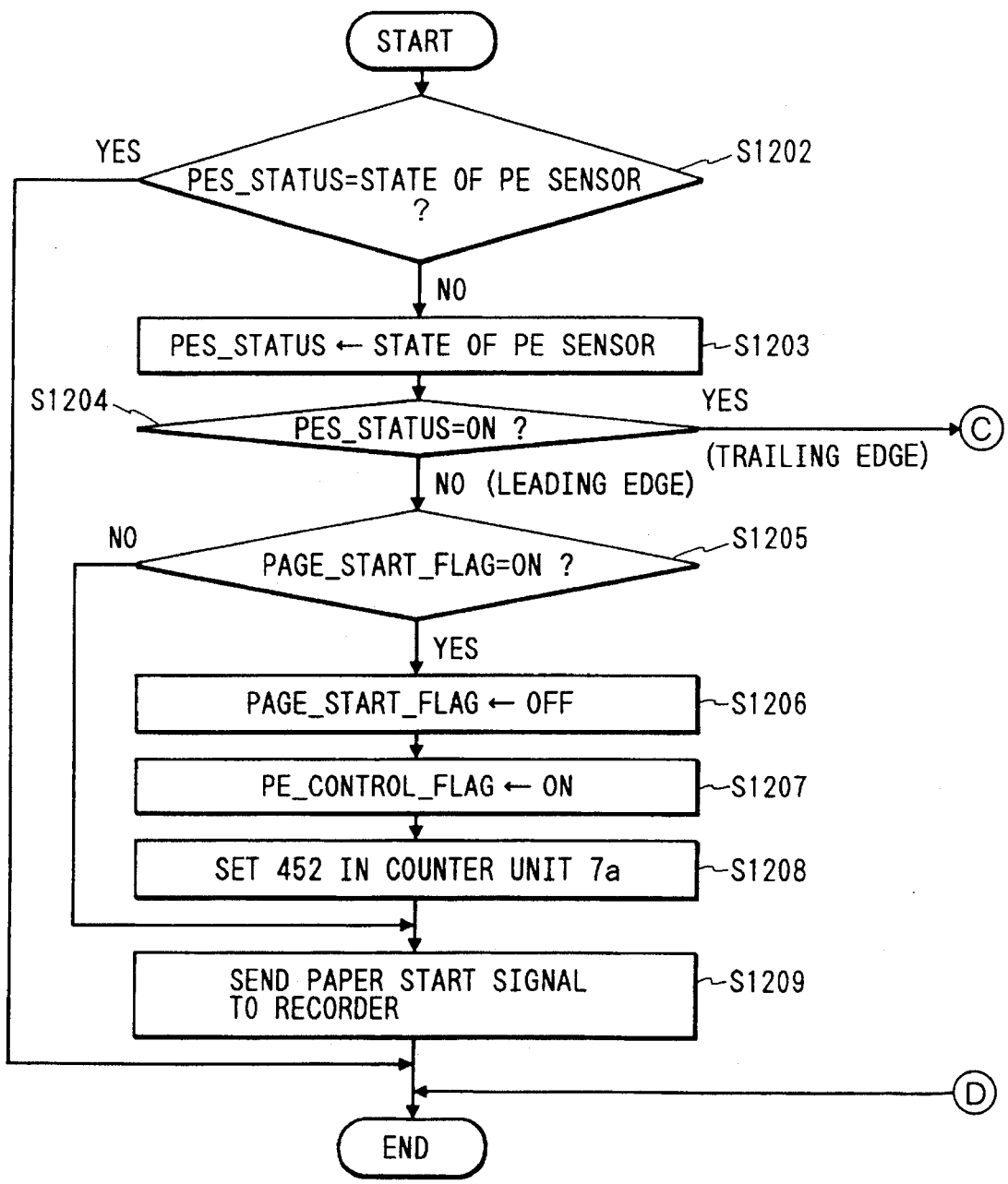
FIG. 13 shows a flow chart of a process of the PE handler.
Figure 14:
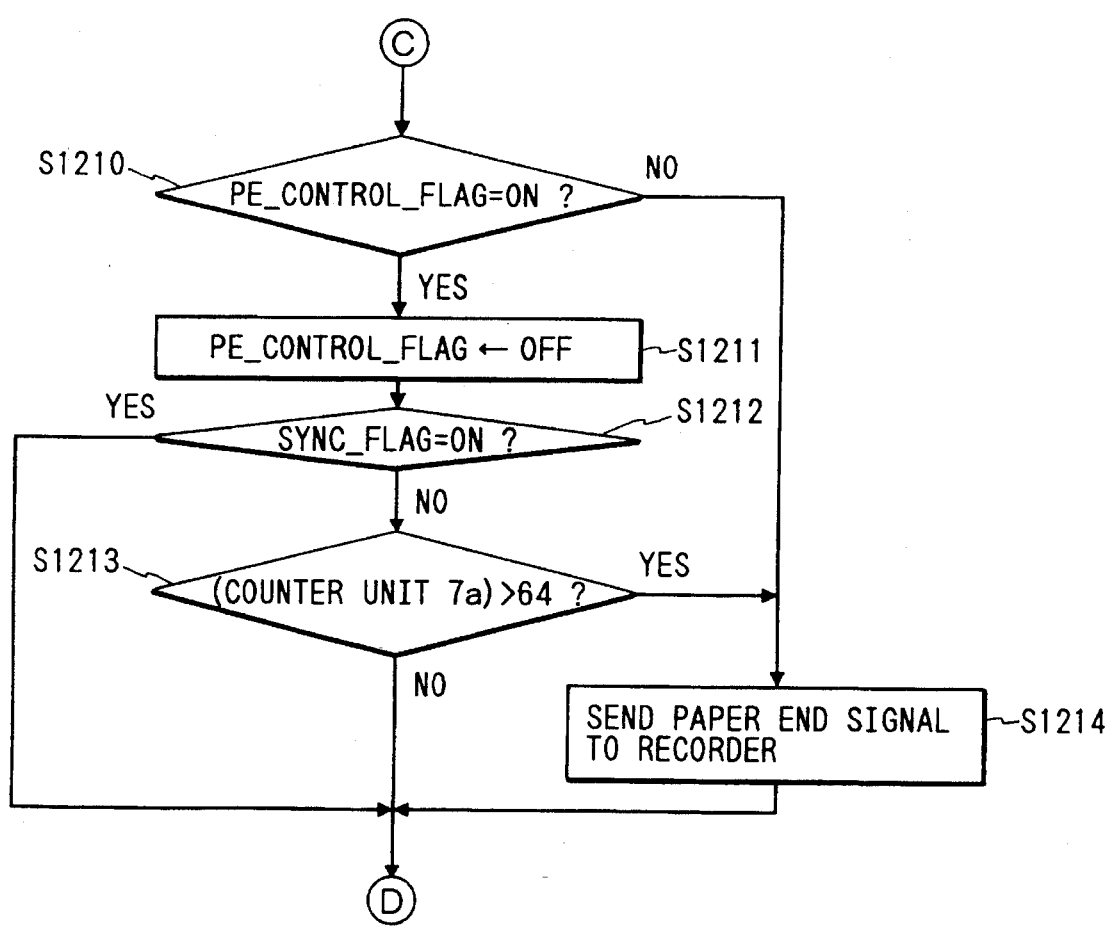
FIG. 14 shows a flow chart of a process of the PE handler.

FIGS. 13 and 14 show flow charts of process of the PE handler.

The PE handler is an interruption handler which is activated at a period of 5 milliseconds. When it is activated, it compares a status of the current PE sensor (that is, the recording sheet sensor 13) and a flag PES_STATUS which indicates a status of the previous PE sensor (step S1202), and if they are equal, the process is terminated. If they are not equal, the status of the current PE sensor is stored in the PES_STATUS (step S1203). The PE sensor is OFF when the recording sheet is on the sensor, and ON when the recording sheet is not on the sensor.

When the change of the status of the PE sensor to ON, that is, the trailing edge of the recording sheet is detected, the process proceeds to a step S1210. When the change of the status of the PE sensor to OFF, that is, the leading edge of the recording sheet is detected, the process proceeds to a step S1205.

In the step S1205, if the PAGE_START_FLAG is ON, the PAGE_START_FLAG is set to OFF (step S1206) and a PE_CONTROL_FLAG is set to ON (step S1207). The PE_CONTROL_FLAG indicates whether the status of the PE sensor 13 is to be directly informed to the recording unit 4 or the timing thereof is to be adjusted by the control unit. When the PE_CONTROL_FLAG is OFF, the status of the PE sensor 13 is directly sent to the recording unit 4 by the PE handler. In a step S1208, 452 is set in the counter unit 7a. It is the number of steps from the reception of the paper start signal by the recording unit 4 to the stop of the feed of the recording sheet at the first recording position. When the count of the counter unit 7a is zero, it means the completion of the queuing of the recording sheet.

In the step S1205, if the PAGE_START_FLAG is OFF, the process proceeds to a step S1209, which is a process in a printer mode not shown. The recording unit 4 of the present embodiment has an external interface, not shown. In the printer mode, the recording unit 4 is separated from the control unit 1 and operates by an external command. In this case, since the PE sensor 13 which should have been connected to the record control unit 15 which controls the recording unit 4 is connected to the control unit 1, it is necessary to inform the status of the PE sensor to the control unit 1 as much in detail as possible. To this end, in the present embodiment, the PAGE_START_FLAG and the PE_CONTROL_FLAG are used to switch between the mode in which status of the PE sensor is directly sent to the recording unit 4 and the mode in which the control unit 1 controls the information of the PE sensor. In a step S1209, the paper start signal is sent to the recording unit 4 and the process is terminated.

When pty trailing edge is detected, if the PE_CONTROL_FLAG is OFF in a step S1210, the paper end signal is immediately sent to the recording unit 4 (step S1214) and the process is terminated. If the PE_CONTROL_FLAG is ON, the process proceeds to a step S1211 to set the PE_CONTROL_FLAG to OFF. In a step S1212, if the SYNC_FLAG is ON, that is, if it is in the synchronization mode, the process is terminated. In a step S1213, if the count of the counter unit 7a is smaller than the number of recordable lines 64 after the detection of the trailing edge of the recording sheet, the process is terminated. In the present embodiment, since the distance from the recording sheet retainer to the PE sensor is approximately 9.4 mm, that is, two scans, 128 line are recordable. In the step S1213, if a count larger than 128 remains in the PAGE_LINE_CNT, it means that data of larger number of lines than the number of recordable lines have been sent to the recording unit 4. Accordingly, the paper end signal is immediately sent to the recording unit 4 (step S1214) and the renewal of page is made in the recording unit 4, and the process is terminated.

The footer process in the step S907 of FIG. 10 is now explained.

Figure 15:
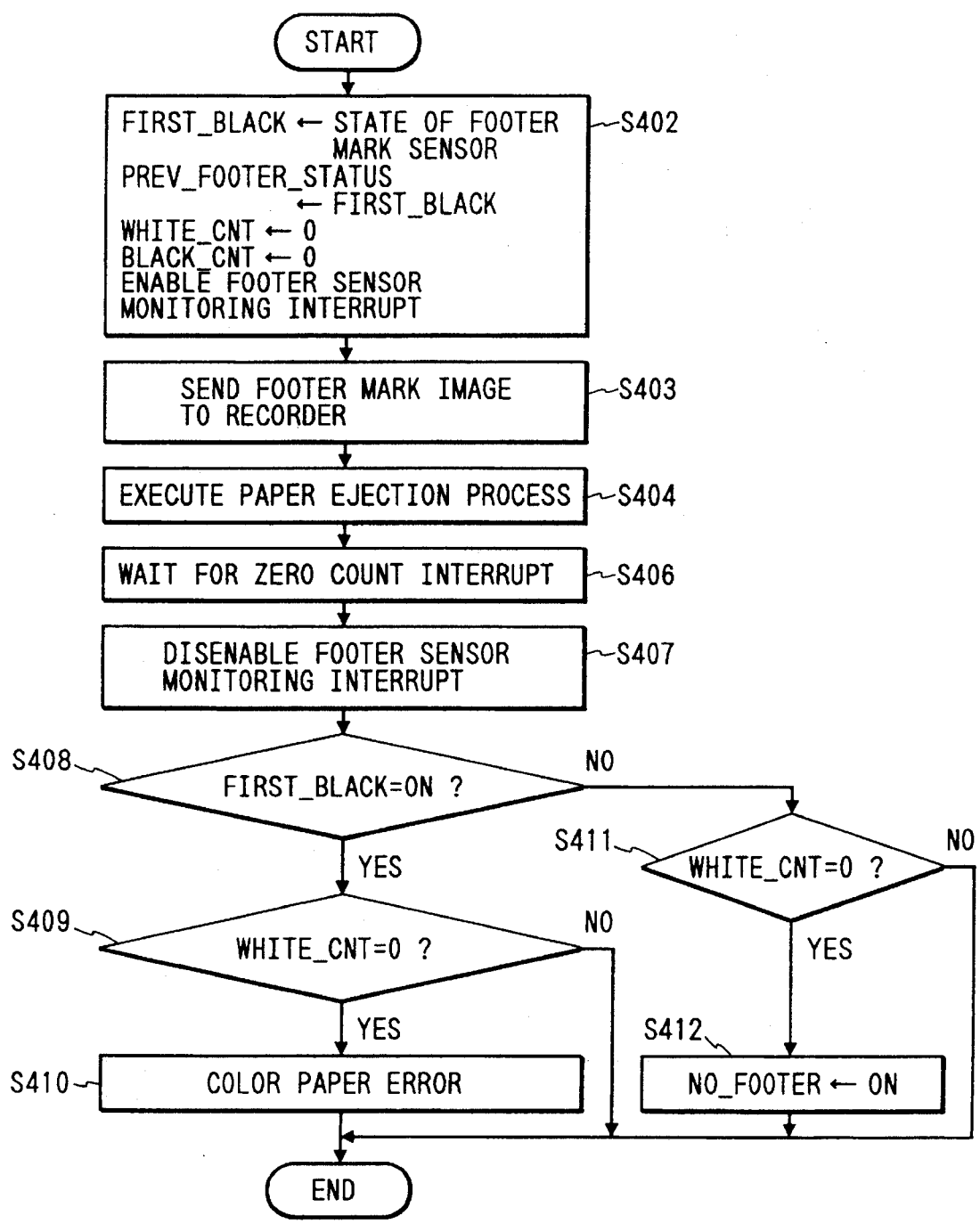
FIG. 15 shows a flow chart a footer mark detection process.
Figure 16:
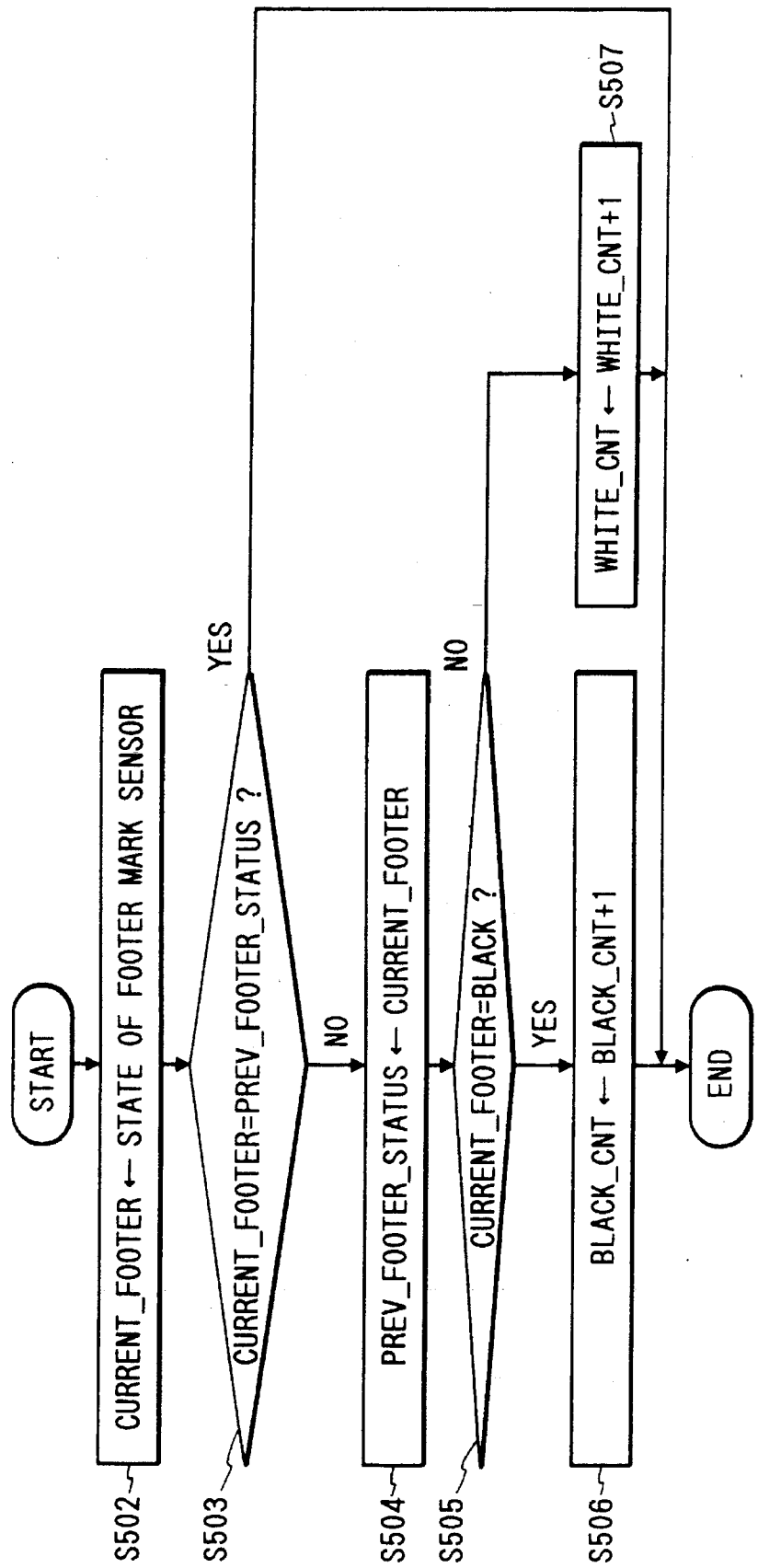
FIG. 16 shows a flow chart of a footer mark detection process.

FIG. 15 and 16 show flow charts of the footer mark detection method.

FIG. 16 shows a process of an interruption handler which is activated at every 1 millisecond to monitor the footer mark sensor and FIG. 15 shows a process of the control unit 1 for controlling it.

Figure 17:
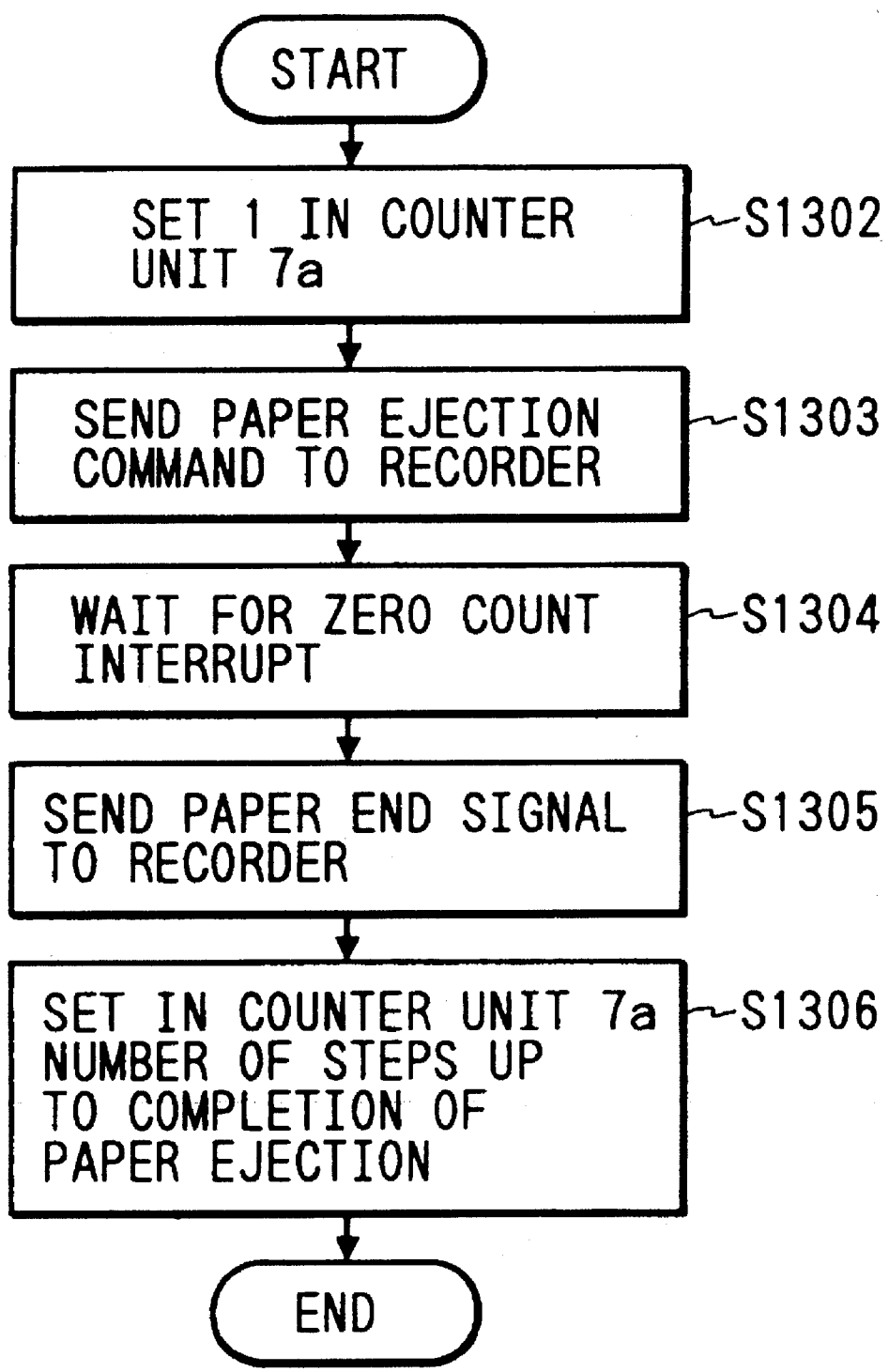
FIG. 17 shows a flow chart of a sheet ejection start process.

In a step S402 of FIG. 15, a status of the footer mark sensor 14 is saved in a FIRST_BLACK and PERV_FOOTER_STATUS, a WHITE_CNT which indicates the number of times of change from white to black and a BLACK CNT which indicates the number of times of change from white to black are initialized, and a footer sensor monitor interruption is enabled. Then, in a step S403, the image (solid black) of the footer mark is sent to the recording unit 4 to cause the recording unit 4 to record the footer mark. In a step S404, a sheet ejection command is sent to the recording unit 4. The sheet ejection process of the step S404 will be explained in detail later (FIG. 17).

In a step S406, the zero count interruption of the counter unit 7a which is a pulse counter for the PF motor is monitored. When the zero count interruption occurs, the process proceeds to a step S407 and the footer monitor interruption is disabled.

In a step S408, if a FIRST_BLACK is ON, that is, if the initial state of the photo-sensor 14 is black, the process proceeds to a step S409, and if it is white, the process proceeds to a step S411. In the step S409, if the WHITE_CNT is 0, the process proceeds to a step S410. This means that the footer sensor continuously detected only black could not detect white at all until the end of the sheet ejection. The following four causes therefor are considered.

a: A colored sheet is used as the recording sheet.
b: A black material (for example, a trailing end of a recording sheet contaminated by ink) is deposited to the footer sensor so that it can detect only black.
c: The recording sheet has jammed while black image information is at the position of the footer sensor.
d: A trailing end of the recording sheet is contaminated by ink. In the present embodiment, this error is called a colored sheet error and a message is generated to a user to request the use of a white sheet.

In the step S411, if the WHITE_CNT is 0, the process proceeds to a step S412. This means that the footer sensor continuously detected only white and did not detect black at all until the end of the sheet ejection, or the status change of only white to black was included and the white in the image information on the footer, the white of the footer, the white in the trailing end margin and the black after the trailing edge of the recording sheet were detected. That is, non-footer status was detected. Thus, in a step S412, a flag NON-FOOTER which indicates the detection of the non-footer is set to ON and the process is terminated. When the NON-FOOTER flag is set to ON, an error process is executed.

FIG. 16 shows a flow chart of the footer monitor interruption process in which the WHITE_CNT and the BLACK_CNT used in the flow chart of FIG. 15 are set. In the step S402, if the footer monitor interruption is enabled, the interruption occurs at an interval of 1 millisecond so that the process of the steps S502 et seq are executed. In the step S502, the status of the current sensor 14 is read and it is saved in a temporary buffer CURRENT_FOOTER. In a step S503, if the status of the current footer is equal to the previous status, the process proceeds to a step S508 and the process is terminated. If they are not equal, the status of the current footer is saved in a buffer PREV_FOOTER_STATUS in a step S504. In a step S505, if the status of the current footer is black, it means that the status of the footer sensor 14 has changed from white to black, and in a step S506, the BLACK_CNT is incremented by one. On the other hand, if the status of the current footer is white in the step S505, it means that the status of the footer sensor has changed from black to white and the WHITE_CNT is incremented by one in a step S507.

FIG. 17 shows a flow chart of the sheet ejection process in the step S908 of FIG. 10 and the step S404 of FIG. 15.

The recording unit 4 used in the present embodiment returns the recording head 11 to a home position only when five seconds have elapsed without receiving command or when the paper end signal is received. When the recording sheet 16 is ejected while the recording head 11 is on the recording sheet 16, the trailing edge of the recording sheet 16 abuts against the head 11 when the recording sheet escapes from the sheet retainer and it may be contaminated by ink. When the recording unit 4 receives the paper end signal after it has received the sheer ejection command and before the start of the sheet ejection operation, it feeds a new recording sheet 16 and ejects it. In order to prevent such inconvenience from occurring, the following sheet ejection process is conduced in the present embodiment.

First, 1 is set in the counter unit 7a (step S1302) and the sheet ejection command is sent to the recording unit (step S1303). The start of the sheet ejection is monitored by the zero count interruption (step S1304) and the paper end signal is sent to the recording unit (step S1305). The purpose of first setting 1 in the counter unit 7a is for checking whether the sheet ejection operation has been started after the sheet ejection command was sent. Finally, the number of steps for the recording sheet to be ejected from the sheet ejection port is set in the counter unit 7a (step S1306) and the process is terminated.

An operation of the flow chart shown above is now explained.

(1) A mode to record the footer mark outside of the image (the FOOTER_FLAG is ON, the FOOTER_PIX_IN is OFF)

First, the CPU 1a of the control unit 1 conducts the initialization process (FIG. 12) of the PE handler and sends the queuing command for the recording paper to the record control unit 15 so that the queuing of the recording sheet is started. After the PE sensor 13 has detected the leading edge of the recording sheet, the counter unit 7a counts a predetermined count (452) so that the recording sheet is fed by a predetermined amount and set to the recording position. After the predetermined count (PAGE_LINE_CNT- 65) has been set in the counter unit 7a, the image data is read from the image memory 5 line by line and they are developed and stored in the image buffer 6. When 64 lines of image data is stored in the image buffer 6, the content of the image buffer 6 is sent to the recording unit 4 and the data is stored in the image buffer 18. Further, a command to feed the sheet by 64 lines for the sub-scan is sent to the record control unit 15. This operation is repeated until the number of remaining recordable lines on the record sheet reaches 64 lines. During this period, the data is sent without synchronization with the recording operation of the recording unit (asynchronous mode). The record control unit 15 sequentially reads the data from the image buffer 18, scans them and feeds the recording sheet by 64 lines each time one record scan is completed.

During this period, the control unit 1 monitors the detection of the trailing edge of the recording sheet by the PE sensor 13, and if the trailing edge of the recording sheet is detected when the number of remaining recordable lines on the recording sheet is no smaller than 128 (counter unit 7a>64), the control unit 1 sends the paper end signal to the record control unit 15 to cause the record control unit 15 to conduct the renewal of page.

When the number of remaining recordable lines (PAGE_LINE_CNT) on the recording sheet reaches 64, the data in the image buffer 6 (if the number of lines of data currently stored in the image buffer 6 does not reach 64, the data derived by filling the remainder of the image buffer 6 with white data) is sent to the recording unit 4. Further, a command to feed the sheet by the number of lines of data stored in the image buffer 6 when the number of remaining recordable lines reaches 64 is sent to the record control unit 15. The recording unit 4 makes the record scan in accordance with the data and sets the recording head to the final scan position.

Then, the control unit 1 sends the image of the footer mark to the recording unit 4. The recording unit 4 records the footer mark at the last scan position on the recording sheet and then ejects the recording sheet. During the sheet ejection, the footer mark is detected and if it is normal, whether it is the end of one page of image or not is determined. If it is not the end, the renewal of page is made and the next recording sheet is fed to record the remaining image and the same operation is repeated.

If the footer mark is not normally recorded, a predetermined error process is conducted and the data of the current page stored in the image memory 5 is saved.

When the control unit 1 detects the end (CRT) of one page of image before the number of remaining recordable lines on the recording sheet reaches 64, it sends the data currently stored in the image buffer 6 (if the number of lines of data currently stored in the image buffer 6 does not reach 64, the data derived by filling the remainder of the image buffer 6 with white data) is sent to the recording unit 4. Further, a command to feed the recording sheet until the recording head reaches the final scan position is sent to the record control unit 15. Thereafter the recording and the detection of the footer mark as those described above are conducted.

(2) A mode to record the footer mark in the image (the FOOTER_FLAG is ON, the FOOTER_PIX_IN is ON)

The same operation as that of (1) is conducted until the number of remaining recordable lines on the recording sheet reaches 64. When it reaches 64, the data in the image buffer 6 (if the number of lines of the data currently stored in the image buffer 6 does not reach 64, the data derived by filling the remainder of the image buffer 6 with white data) is sent to the recording unit 4. Further, a command to feed the sheet by the number of lines of the data stored in the buffer 6 when the number of remaining recordable lines reaches 64 is sent to the recording unit 4. The recording unit 4 conducts the record scan in accordance with the data and sets the recording head to the final scan position. The image data is read from the image memory 5 line by line for the final scan and they are developed and stored in the image buffer 6. When 64 lines of data is stored in the image buffer 6, it is sent to the recording unit 4. In this case, sheet feed is not conducted (FLC=0). Under this condition, the footer mark is recorded in the same manner as that of the case (1) and the record status is detected to determine whether the received data has been properly recorded or not.

When the end of one page of image is detected before the number of remaining recordable lines on the recording sheet reaches 64, the data currently stored in the image buffer 6 (if the number of lines of the data currently stored in the image buffer 6 does not reach 64, the data derived by filling the remainder of the image buffer 6 with white data) is sent to the recording unit as it is in the case (1). Further, a command to feed the sheet to set the recording head to the final scan position is sent to the recording unit 4. The recording of the footer mark and the detection of the record status are conducted as they are in the case (1) to determine whether the received data has been properly recorded or not.

(3) A mode not to record the footer mark (the FOOTER_FLAG is OFF, the FOOTER_PIX_IN is OFF)

In this case, the operation is same as that of the case (2) until the data of the final scan is sent to the recording unit 4. Thereafter, the sheet is ejected without printing the footer mark and the printed sheet is ejected out of the apparatus.

As explained above, by setting the number of recordable lines in the counter unit 7a at the start of the recording and monitoring the zero count interruption of the counter unit 7a, the image data can be sent to the recording unit 4 while neglecting the operation of the recording unit 4. Accordingly, the idling time can be effectively used for other processes. Further, in accordance with the present method, the image buffer 18 in the recording unit 4 can be effectively used and the record control unit 15 conducts the recording process while it refers to the previous image data. As a result, the recording speed is improved.

EMBODIMENT 2

In the method of the embodiment 1, the constant number of lines are printed on the preset recording sheet. Thus, where the recording sheet feed precision of the recording unit 4 is low, the trailing edge margin of the recording sheet 16 increases or decreases. Further, when a recording sheet of a different size than that which the user has set, the trailing edge margin increases if it is larger than the preset size and the renewal of page is made by the recording unit if it is smaller than the preset size.

The facsimile apparatus of the embodiment 2 monitors the completion of the recording each time one scan of data is sent, and the send-out of the data is synchronized with the operation of the recording unit 4. In this manner, whenever the trailing edge of the recording sheet is detected, the facsimile apparatus can cope therewith. When the trailing edge of the recording sheet is detected, a predetermined amount of recording is conducted after the detection of the trailing edge and then the renewal of page is made so that the trailing edge margin of the recording sheet is uniform and the footer mark is surely recorded. The configuration of the facsimile apparatus of the embodiment 2 is similar to that of the embodiment 1 and the explanation thereof is omitted.

Figure 7B:
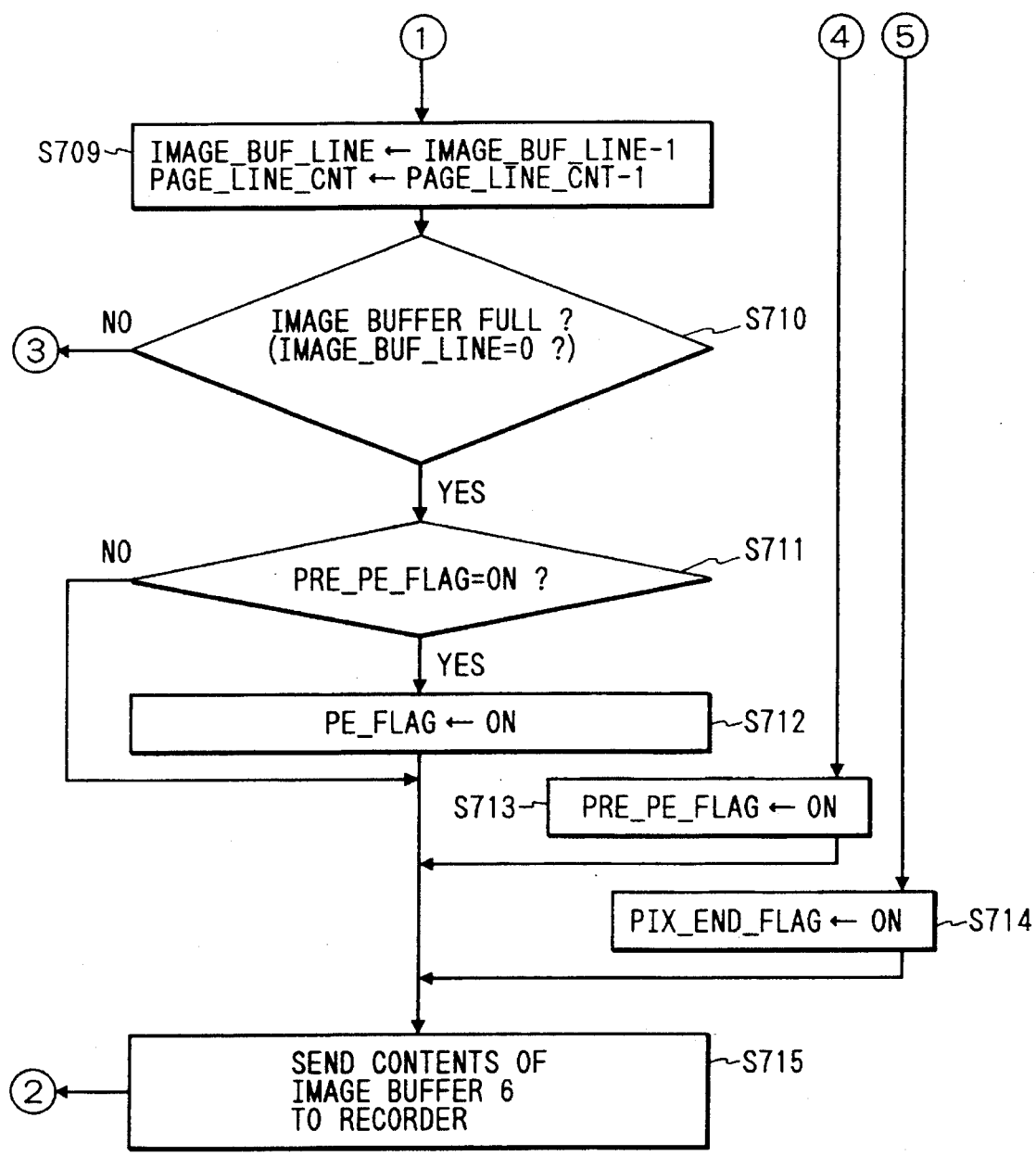
Figure 18:
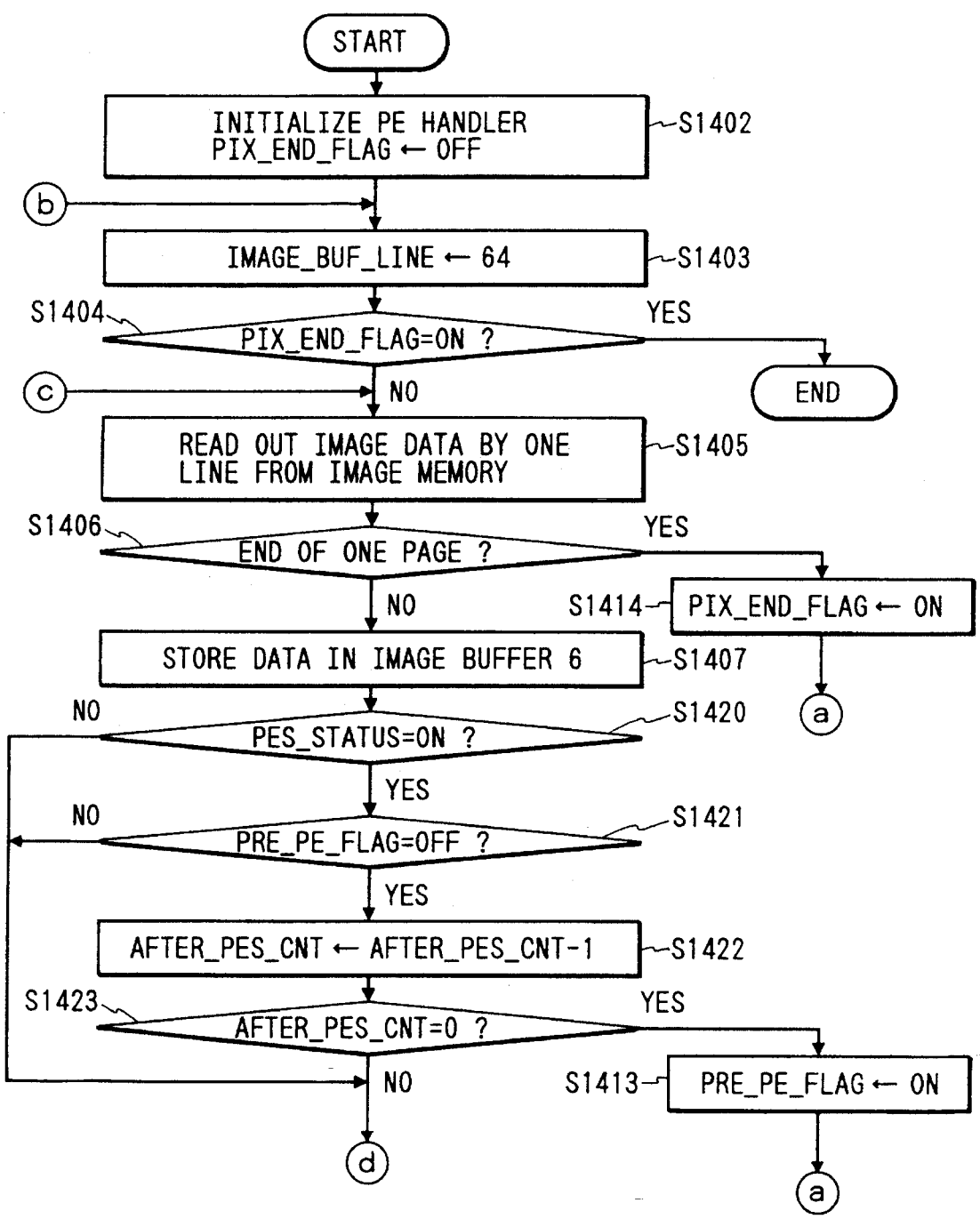
FIG. 18 shows a flow chart of a page recording process in an embodiment 2.
Figure 19:
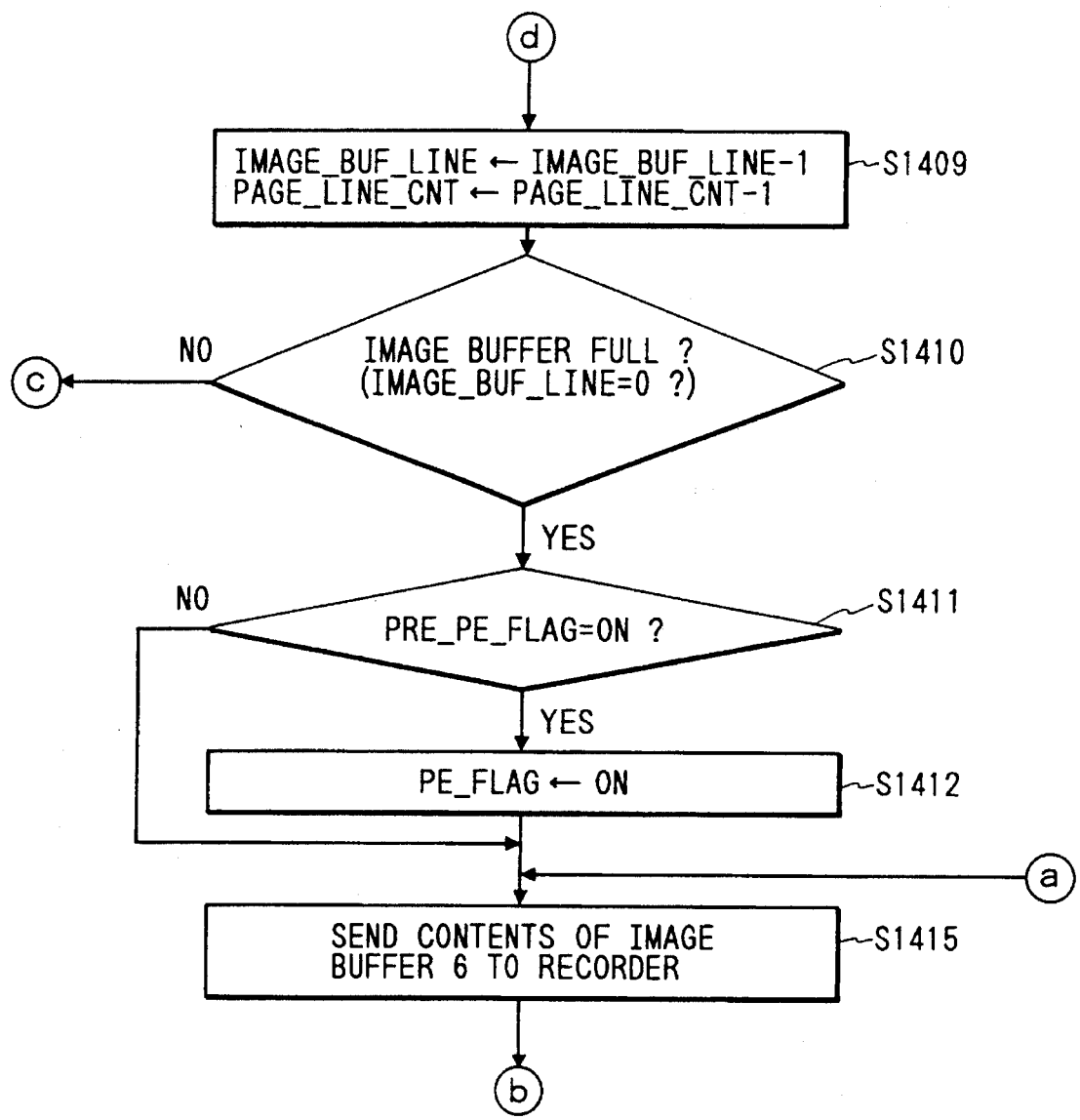
FIG. 19 shows a flow chart of a page recording process in the embodiment 2.
Figure 20:
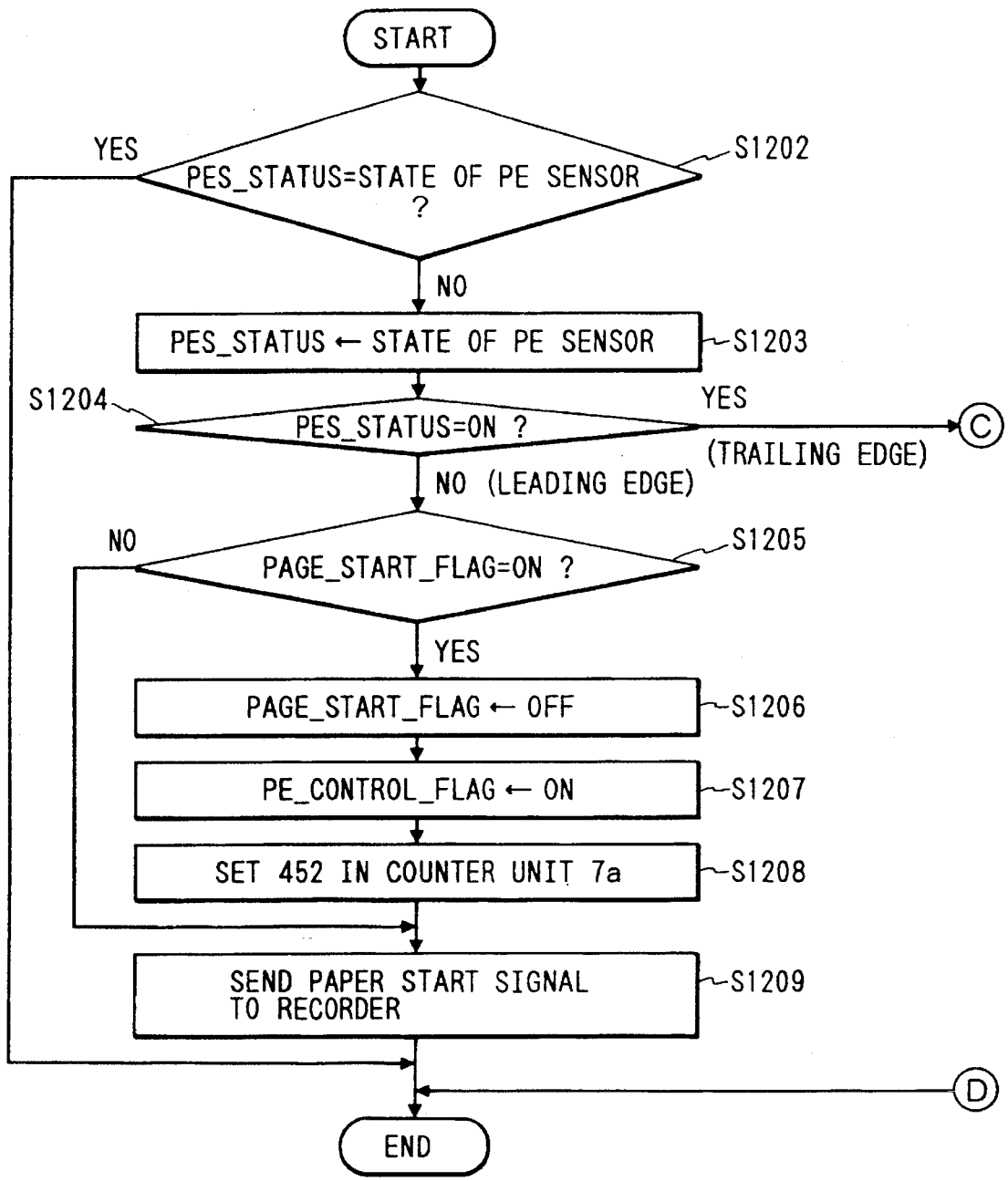
FIG. 20 shows a flow chart of a PE a handler process in the embodiment 2.
Figure 21:
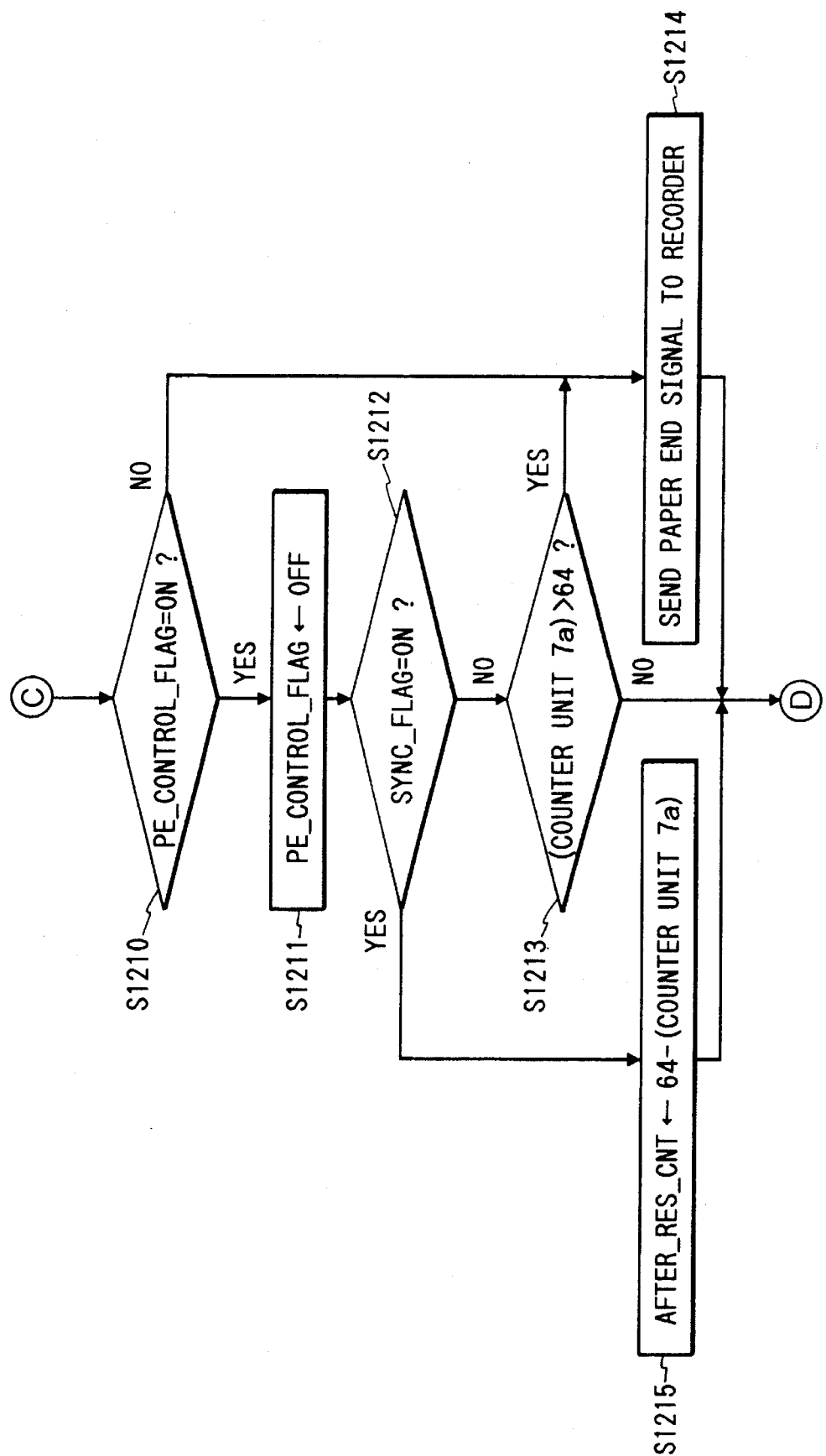
FIG. 21 shows a flow chart of a PE handler process in the embodiment 2.

In a step S1108 of FIG. 12, the SYNC_FLAG which is OFF is set to ON and the content of the page recording process shown in FIGS. 7A and 7B are changed to those shown in FIGS. 18 and 19. The steps S904 and S905. of the page ending process of FIG. 10 are deleted. By those modifications, the completion of the feed of the recording sheet is monitored in the feed process of FIG. 11. A step S1215 shown in FIG. 20 is added as a PE handler process. Accordingly, the operation is synchronized with the operation of the recording unit 4 for each scan of recording and whenever the PE handler detects the trailing edge of the recording sheet, it can cope therewith.

FIGS. 18 and 19 show flow charts of the page recording process in the embodiment 2. Steps S1401 to S1407 and steps S1409 to S1416 correspond to the steps S701 to S707 and the steps S709 to S716 of FIGS. 7A and 7B, respectively, and the explanation thereof is omitted. The process of the step S708 of FIG. 7A is modified to steps S1420 to S1423.

In a step S1420, if the PES_STATUS is ON, it means that the recording sheet has not been detected by the recording sheet sensor (PE sensor) 13 and the process proceeds to a step S1421. If it is OFF, it means that the recording sheet has been detected and the process proceeds to a step S1409. In the step S1421, if the PRE_PE_FLAG is ON, the process proceeds to a step S1409, and if it is OFF, the process proceeds to a step S1422. The PES_STATUS is a flag which is set by the PE handler (see FIG. 13) to represent the status of the PE sensor (recording sheet sensor) 13. The PRE_PE_FLAG indicates that the number of remaining recordable lines is one-scan lines. Namely, the process proceeds to the step S1422 during the period between the passage of the trailing edge of the recording sheet past the PE sensor and the reach of the number of remaining recordable lines to one-scan lines.

In the step S1422, an AFTER_PES_CNT which represent the number of remaining recordable lines before the number of remaining recordable lines reaches one-scan lines is decremented, and if the AFTER_PES_CNT reaches 0 (step S1423), the PRE_PE_FLAG is set to ON (step S1413). If it is not 0, the process proceeds to a step S1409.

Figure 22:
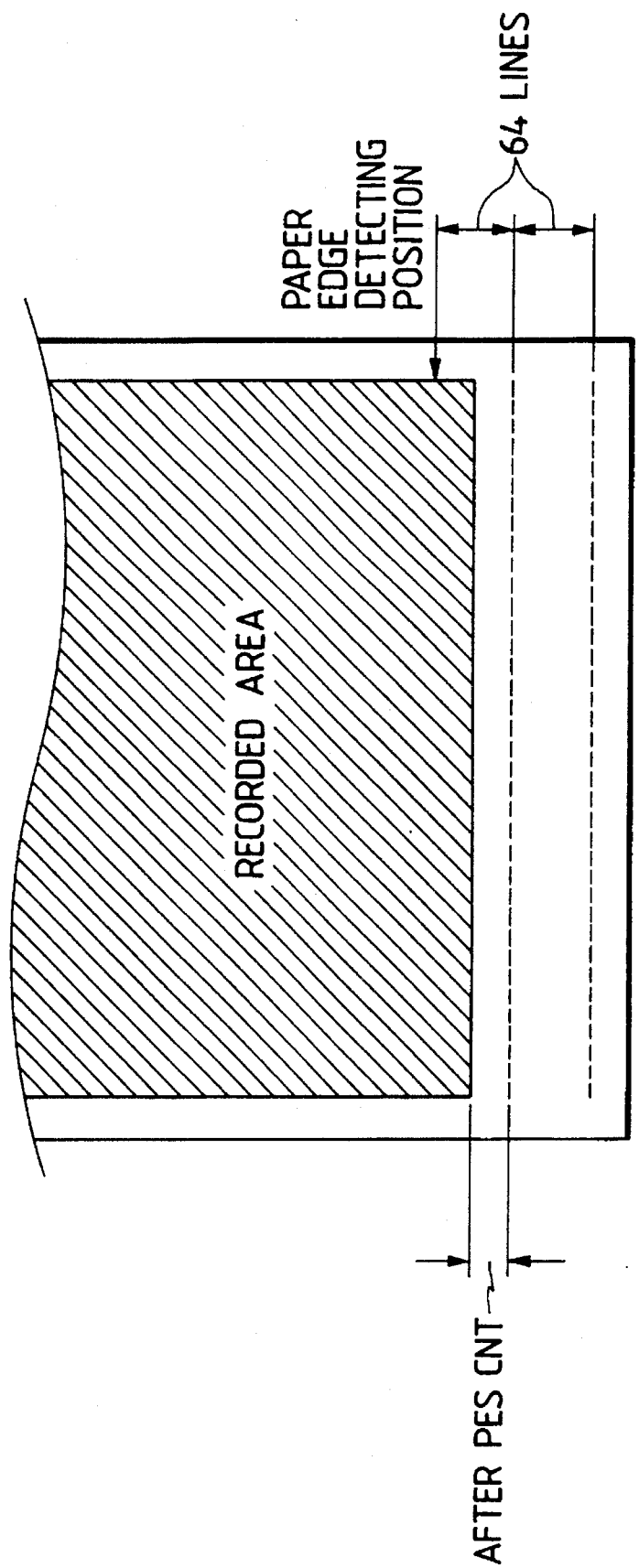
FIG. 22 shows an operation of a recording process in the embodiment 2.

The AFTER_PES_CNT has been set in the step S1215 of FIG. 14. The meaning represented by the AFTER_PES_CNT is explained with reference to FIG. 22. The trailing edge of the recording sheet is detected during the execution of the feed process (FIG. 11) while the counter unit 7a is set to 63. Accordingly, when the AFTER_PES_CNT is set to (64—the content of the counter unit 7a) in the step S1215, it means that the recording of up to 64 lines (one-scan lines) is conducted from the detection position of the trailing edge of the recording sheet in the page recording process. The PRE_PE_FLAG is always set at the position of 64 lines from the detection position of the trailing edge of the recording sheet.

In this manner, the number of record lines after the detection of the trailing edge of the recording sheet by the PE sensor is kept uniform. In the embodiment 2, after the detection of the trailing edge of the recording sheet, two-scan lines (128 lines) including the scan for processing the footer are recorded. In this manner, the image is always recorded up to the predetermined position from the trailing edge of the recording sheet and the footer is recorded, without regard to the error in the feed of the recording sheet and the size of the recording sheet.

EMBODIMENT 3

In the method of the embodiment 2, the footer mark can be recorded at the predetermined position from the trailing edge of the recording sheet whatever it is but only one-scan lines of image buffer 18 of the recording unit 4 can be used. Further, since the record control unit 15 cannot monitor the previous image data, the recording speed is lower than that of the embodiment 1.

In the embodiment 3, facsimile apparatus in which the recording is made in the method of the embodiment 1 in a range a little bit smaller than the size of the recording sheet which is probably actually used, and thereafter the recording is made in the method of the embodiment 2. The facsimile apparatus of the embodiment 3 also has a similar configuration to that of the embodiment 1 and the explanation thereof is omitted.

Figure 23:
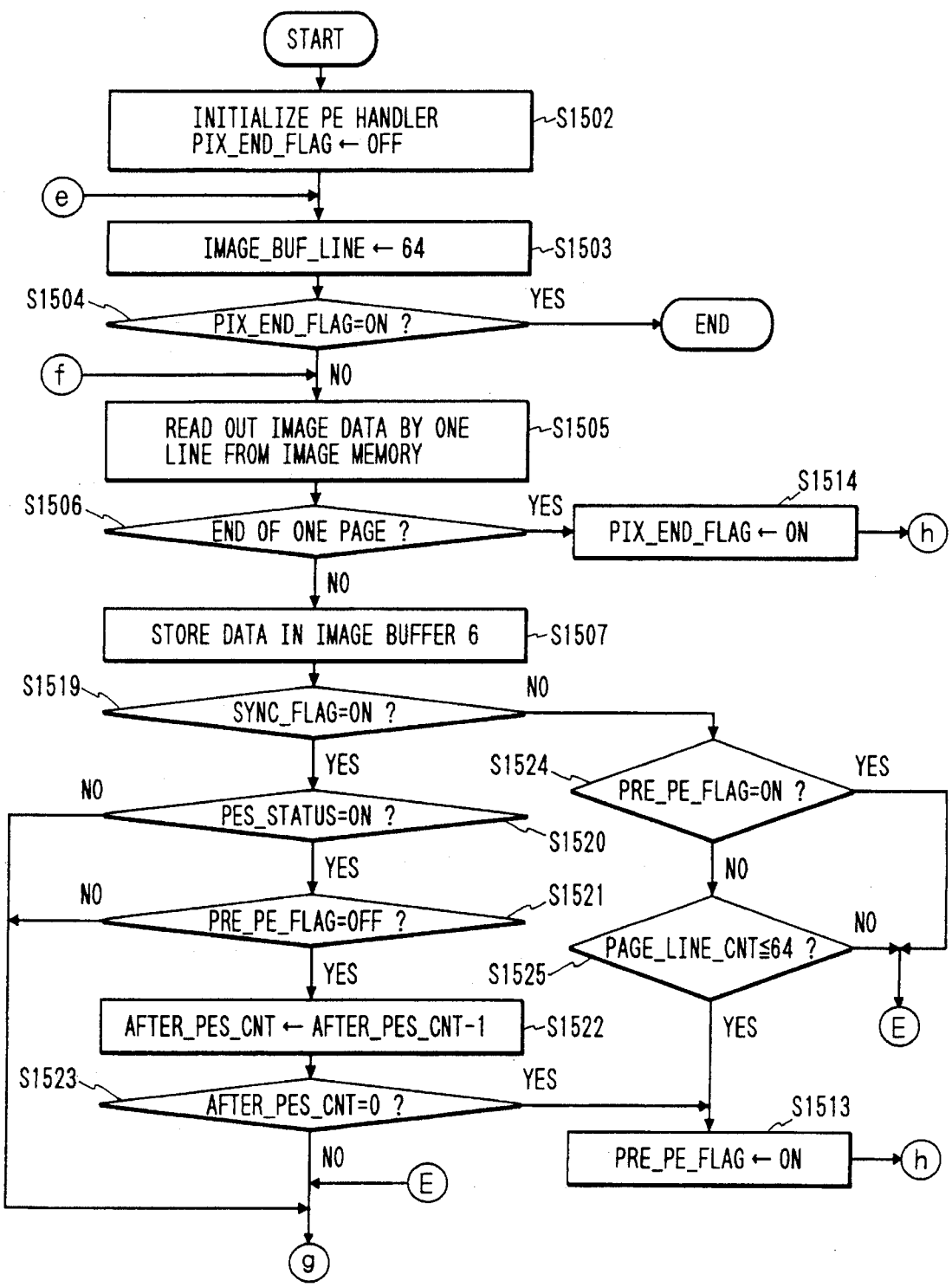
FIG. 23 shows a flow chart of a page recording process in an embodiment 3.
Figure 24:
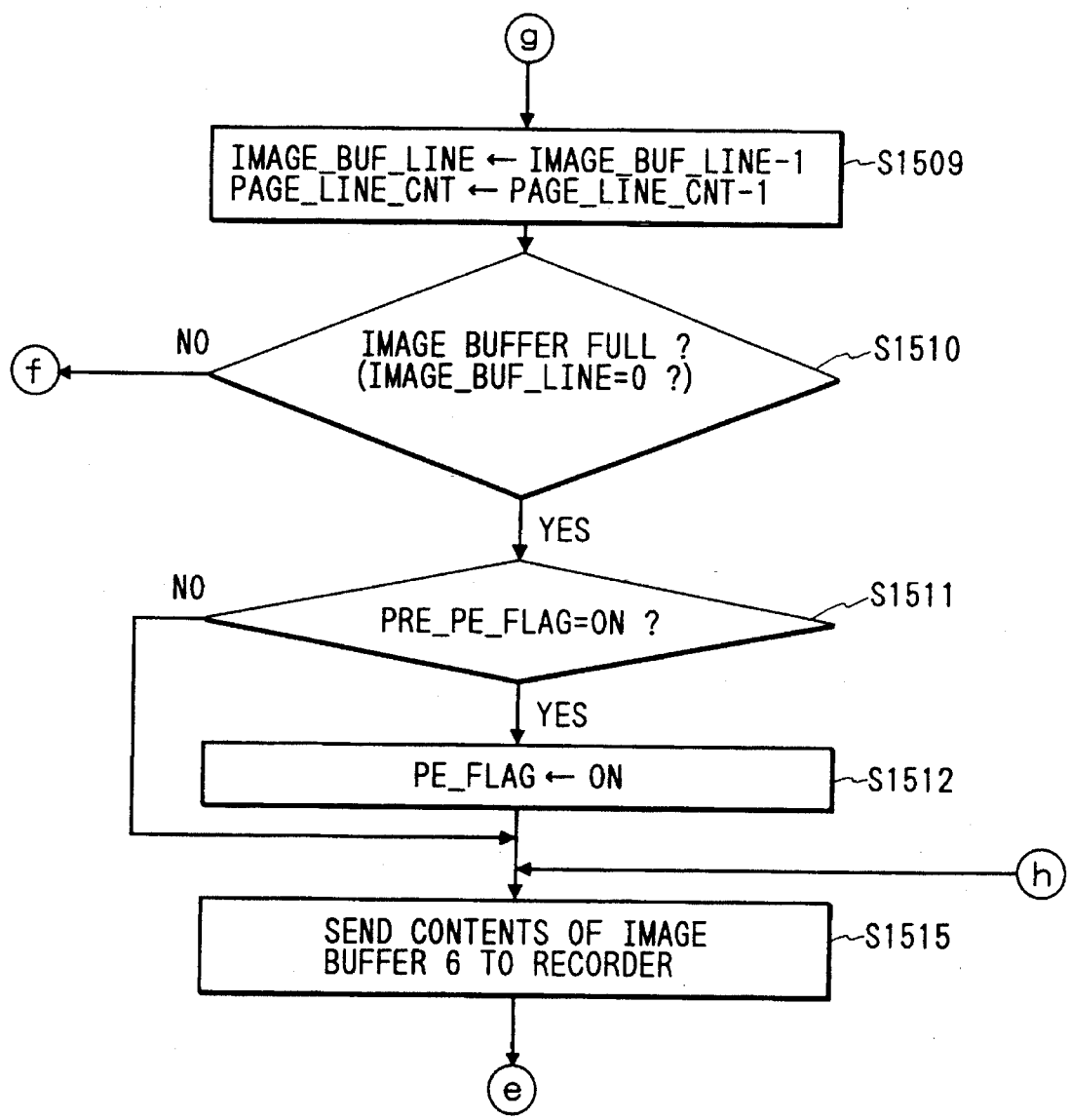
FIG. 24 shows a flow chart of a page recording process in the embodiment 3.

FIGS. 23 and 24 show flow charts of the page recording process in the embodiment 3. Steps S1501 to S1507 and steps S1509 to S1516 correspond to the steps S701 to S707 and the steps S709 to S716 of FIGS. 7A and 7B, respectively, and the explanation thereof is omitted. The process of the step S708 of FIG. 7A is modified to that of steps S1519 to S1525.

In a step S1519, if the SYNC_FLAG is ON, the process proceeds to a step S1520. In the step S1520, if the PES_STATUS is ON (the recording sheet has not been detected by the recording sheet sensor 13), the process proceeds to a step S1521. If it is OFF (the recording sheet has been detected by the recordings sheet sensor 13), the process proceeds to a step S1509. In a step S1521, if the PRE_PE_FLAG is ON, the process proceeds to a step S1509, and if it is OFF, the process proceeds to a step S1522. The PES_STATUS is a flag which is set by the PE handler (see FIG. 13) and it represents the status of the PE sensor 13. The PRE_PE_FLAG indicates that the number of remaining recordable lines is one-scan lines. Namely, during the period between the passage of the trailing edge of the recording sheet past the PE sensor 13 to the reach of the number of remaining recordable lines to one-scan lines, the process proceeds to a step S1524. In the step S1522, the AFTER_PES_CNT which indicates the number of remaining recordable lines before the number of remaining recordable lines reaches one-scan lines is decremented, and if the AFTER_PES_CNT reaches 0 (step S1523), the PRE_PE_FLAG is set to ON (step S1513). If the AFTER_PES_CNT is not 0, the process proceeds to a step S1509.

In the step S1519, if the SYNC_FLAG is OFF, the process proceeds to a step S1524. In the step S1524, if the PRE_PE_FLAG is ON, or in a step S1525, if the PAGE_LINE_CNT is larger than 64, the process proceeds to a step S1509. If the PRE_PE_FLAG is OFF in the step S1524 and the PAGE_LINE_CNT is no larger than 64 in the step S1525, the PRE_PE_FLAG is set to ON in a step S1513 and the process proceeds to a step S1515.

Figure 25:
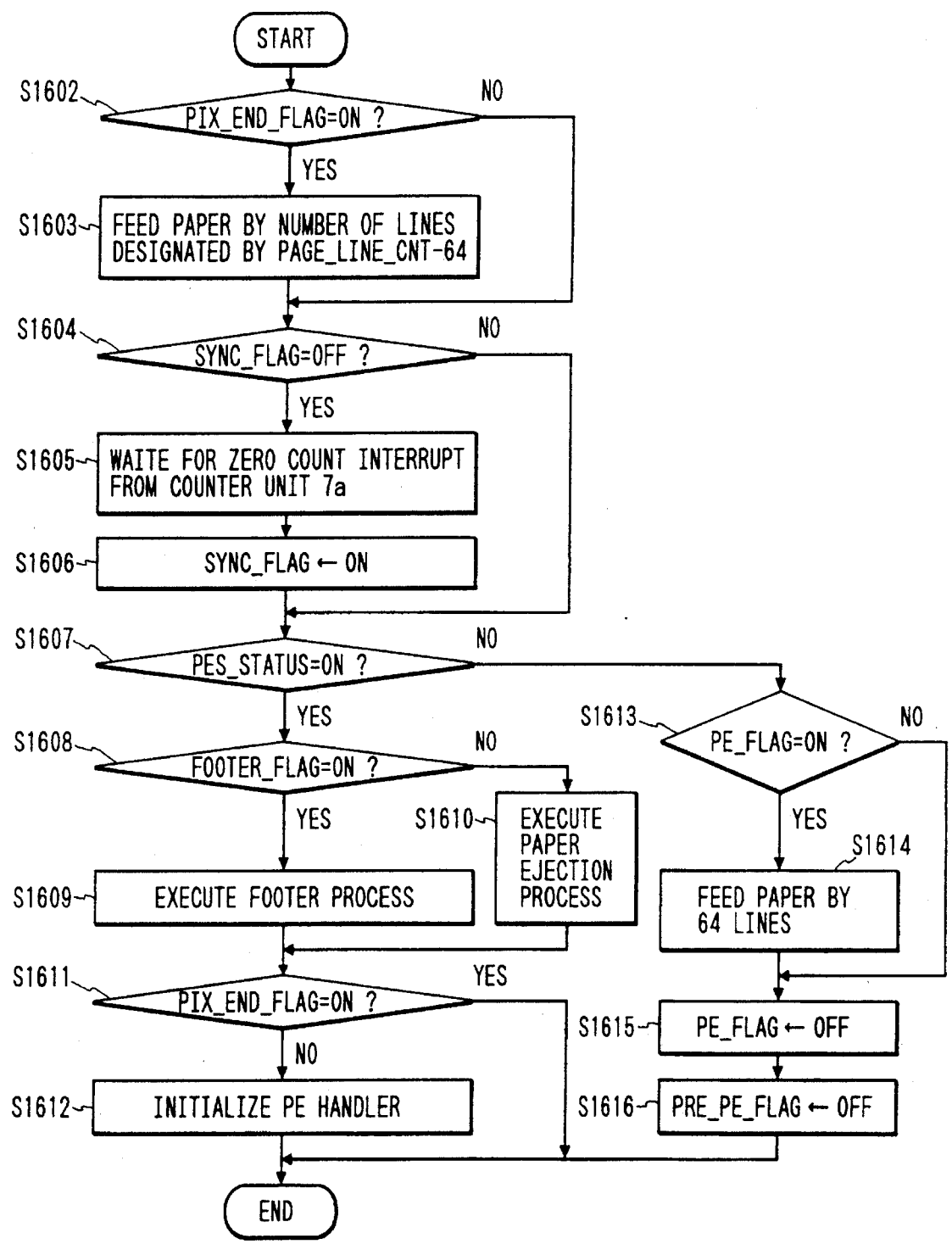
FIG. 25 shows a flow chart of a page ending process in the embodiment 3.

FIG. 25 shows a flow chart of the page ending process in the embodiment 3.

In a step S1602, if the PIX_END_FLAG is ON, the recording sheet is fed to the trailing edge in a step S1603 and the process proceeds to a step S1604. In the step S1602, if the PIX_END_FLAG is OFF, the process proceeds to the step S1604.

In the step S1604, if the SYNC_FLAG is OFF, an interruption signal from the counter unit 7a is monitored in a step S1604 to monitor the completion of the recording of the image sent by the recording unit 4. When the recording of the image is completed, the SYNC_FLAG is set to ON (step S1606) and the process proceeds to a step S1607. Namely, when the SYNC_FLAG is OFF, the number of lines of one page has been set in the counter unit 7a during the initialization process of the PE handler (which will be described later with reference to FIG. 24) done at the start of the recording. Accordingly, the end of the recording can be detected by the zero count interruption of the counter unit 7a. In the step S1604, if the SYNC_FLAG is ON, it means the synchronization mode. Since the image data sent to the recording unit 4 has already been recorded, the process proceeds to a step S1607.

In the step S1607, if the PES_STATUS is ON, that is, if the trailing edge of the recording sheet has already passed the PE sensor 13, the process proceeds to a step S1608 to conduct the page ending process. In the step S1608, if the FOOTER_FLAG is ON, the process proceeds to a step S1609 to conduct the footer process. If it is OFF, the process proceeds to a step S1610 to conduct the sheet ejection process. The footer process of the step S1609 is same as that shown in FIGS. 15 and 16. The detail of the sheet ejection process is same as that shown in FIG. 17. In a step S1611, if the PIX_END_FLAG is ON, that is, if there is no longer line to be recorded in the image under recording, the process is terminated. In the step S1611, if the PIX_END_FLAG is OFF, that is, if there is a line to be recorded, the next recording sheet is queued in a step S1612 and the PE handler initialization process is conducted to initialize variables.

In a step S1607, if the PES_STATUS is ON, that is, if the trailing edge of the recording sheet has not yet passed the PE sensor, the process proceeds to a step S1613 to continue the recording in the synchronization mode. In the step S1613, if the PE_FLAG is ON, it means that the sheet ejection is to be conducted but the sheet has not yet been fed, and the sheet is fed by one-scan lines and the process proceeds to a step S1615. In the step S1613, if the PE_FLAG is OFF, the process proceeds to the step S1615. The PE_FLAG and the PRE_PE_FLAG are set to OFF (steps S1615 and S1616) to continue the recording in the synchronous mode and the process is terminated.

Figure 26:
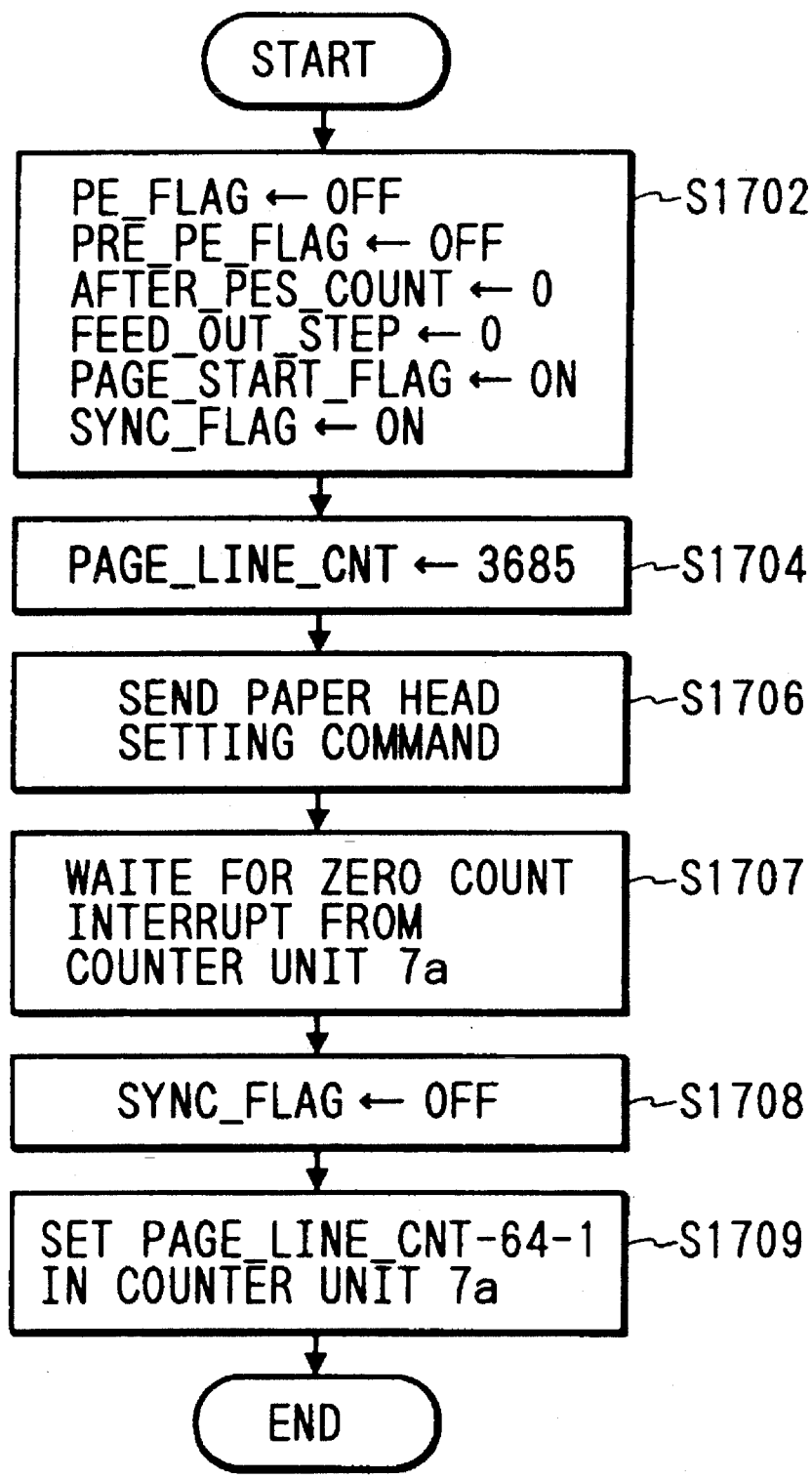
FIG. 26 shows a flow chart of an initialization process of a PE handler in the embodiment 3.

FIG. 26 shows a flow chart of the initialization process of the PE handler in the embodiment 3.

Steps S1701 to S1702 and steps S1706 to S1710 correspond to the steps S1101 to S1102 and the steps S1106 to S1110 of FIG. 9, respectively, and the explanation thereof is omitted since it is identical to that of the embodiment 1.

The shortest recording sheet of the recording sheets which may possibly used in the present embodiment is a letter LTR sheet. It has a length of 279 mm of which 268 mm is a recordable range. An error between the designated feed amount from the leading edge to the trailing edge in the recording process and the actual feed amount is determined based on the precision of the parts and the mounting presicion and the recordable range is set to 260 mm. Accordingly, in a step S1704, 3685 lines are set to be recorded in a fixed size mode.

In accordance with the facsimile apparatus of the above embodiments, the operation status can be grasped even in a printer unit such as a line printer which has no concept of page or a printer unit which has no interface to transmit an operation status of the printer to external. Further, a recordable range of one page is flexible. Accordingly, an inexpensive printer can be used as a recording unit of the facsimile apparatus.

The present invention may be applied to either a system comprising a plurality of equipments or a system comprising a single equipment. The present invention is also applicable to a combination of the system and a program.

The present invention is also applicable to a facsimile apparatus which uses an ink jet recording system such as a so-called piezo type ink jet recorder using a piezo-electric element as an energy source to discharge ink as a recording unit. High density recording and fine recording are attained particularly when the present invention is applied to a recording head and recording apparatus in which status change in ink is caused by thermal energy and the ink is discharged from a discharge port by the status change.

A typical configuration thereof and a principle are disclosed in U.S. Pat. No. 4,723,129 and U.S. Pat. No. 4,740,796. The present system is applicable to either an on-demand type or a continuous type. In the on-demand type, at least one drive signal which causes a rapid temperature rise over a nuclear boiling point in accordance with recording information is applied to electro-thermal converters arranged on sheets by which liquid (ink) is held in order to generate the thermal energy in the electro-thermal converters to cause film boiling on a thermal acting plane of a recording head. As a result, bubbles of ink which directly correspond to the drive signal are formed. To form the bubbles, the liquid (ink) is discharged by contraction through the discharging port to form at least one droplet. When the drive signal is a pulse signal, the formation and the contraction of the bubble can be attained instantly and properly and highly responsible discharge of liquid (ink) is attained. The drive by the pulse signal is disclosed in U.S. Pat. No. 4,463,359 and U.S. Pat. No. 4,345,262. When a condition disclosed in U.S. Pat. No. 4,313,124 relating to a temperature rise factor on the thermal acting plane is adopted, better recording can be attained.

The recording head may be a combination of discharge ports, a liquid path and electro-thermal converters (linear liquid flow path or orthogonal liquid flow path) disclosed in the above patents, or a construction shown in U.S. Pat. No. 4,558,333 or U.S. Pat. No. 4,459,600 which discloses to arrange the thermal acting portion in a curved area. Further, it may be a construction as disclosed in Japanese Laid-Open Patent Application No. 59-123670 in which a common slit to a plurality of electro-thermal converters is used as a discharge portion of the electro-thermal converters or Japanese Laid-Open Patent Application No. 59-138461 in which an aperture for absorbing a pressure wave of thermal energy is formed for the discharge potion. Whatever the construction of the recording head is, the recording can be attained in the efficient manner.

The present invention is also applicable to a full line type recording head having a length equal to a maximum width of a recording medium on which the recording apparatus can print. Such a recording head may meet the length requirement by a combination of a plurality of recording heads or a single integral recording head. In a serial type recording head, the present invention is also applicable if an exchangeable chip type recording head which permits electrical connection with a main unit and supply of ink from the main unit when it is mounted on the main unit, or a cartridge type recording head is used.

It is preferable to add auxiliary means to the recording head used in the recording unit of the present invention to further stabilize the effects of the present invention. For example, preliminary heating means by an electro-thermal converter or other heating element or a combination thereof may be provided to attain stable recording.

The type and the number of the recording heads mounded may be one for monochromatic ink or plural for a plurality of inks of different colors or densities.

What is claimed is:

1. An image recording apparatus comprising:
   print data generation means for generating print data, including first control means for controlling a process relating to the generation of the print data;
   recording means for recording an image on a recording medium in accordance with the print data generated by said print data generation means;
   feed means for feeding the recording medium to a recording position of said recording means;
   second control means for controlling operations of said recording means and said feed means;
   detection means for detecting the recording medium upstream of the recording position along the feed direction of the recording medium; and
   count means for counting a feed amount of the recording medium by said feed means;
   said first control means determining whether remaining print data can be printed or not at the detection of a trailing edge of the recording medium by said detection means based on the count of said count means and outputting a control signal to renew a page to said second control means when a decision not to permit the recording is made.

2. An image recording apparatus according to claim 1 wherein said print data generation means sends the print data to said recording means independently from the operation of said recording means until said count means counts up a predetermined count indicating that a predetermined recording area on the recording medium has reached the recording position.

3. An image recording apparatus according to claim 2 wherein said print data generation means sends the next print data to said recording means after the completion of the recording operation of the sent-out print data after said count means counted the predetermined count.

4. An image recording apparatus according to claim 2 wherein said print data generation means sends predetermined pattern data to said recording means after the completion of the recording operation of the sent-out print data after said count means counted the predetermined count.

5. An image recording apparatus according to claim 4 wherein said predetermined pattern data is data for recording on the recording medium a pattern for determining whether the recording has been properly made or not.

6. An image recording apparatus according to claim 2 wherein said first control means outputs the control signal to said second control means when said detection means detects a trailing edge of the recording medium before said count means counts up the predetermined count.

7. An image recording apparatus according to claim 3 wherein said first control means sends a signal to said second control means to eject the recording medium after the recording of the next print data and sends the control signal to renew the page after the start of the ejection operation.

8. An image recording apparatus according to claim 4 wherein said first control means sends a signal to said second control means to eject the recording medium after the recording of the pattern data and sends the control signal to renew the page after the start of the ejection operation.

9. An image recording apparatus according to claim 1 wherein said print data generation means generates the print data in accordance with image data sent through a line.

10. An image recording apparatus according to claim 1 wherein said recording means includes a recording head having a plurality of recording elements arranged thereon and drive means for relatively moving said recording head in a different direction than a direction of arrangement of said recording elements, and the record scan is made by the relative movement.

11. An image recording apparatus according to claim 10 wherein said recording elements record an image on the recording medium by discharging ink droplets in accordance with the print data.

12. An image recording apparatus according to claim 11 wherein said recording elements discharge ink droplets by causing status change in the ink by using thermal energy.

13. An image recording apparatus comprising:
    print data generation means for generating print data including first control means for controlling a process relating to the generation of the print data;
    recording means for recording an image on a recording medium in accordance with the print data generated by said print data generation means;
    feed means for feeding the recording medium to a recording position of said recording means;
    second control means for controlling operations of said recording means and said feed means; and
    count means for counting a feed amount of the recording medium by said feed means;
    said print data generation means sends the print data to said recording means independently from the operation of said recording means until the count of said count means reaches predetermined count indicating that a predetermined recording area of the recording medium has reached the recording position, and sends the next data to said recording means after the completion of the recording operation of the sent-out print data after the count by said count means has reached the predetermined count.

14. An image recording apparatus according to claim 13 further comprising detection means for detecting the recording medium upstream of the recording position along the feed direction of the recording medium;
    wherein said first control means outputs a predetermined control signal to said second control means when said detection means detects a trailing edge of the recording medium before said count means counts up the predetermined count.

15. An image recording apparatus according to claim 13 wherein said first control means sends a signal to said second control means to eject the recording medium after the recording of the next print data and sends the predetermined control signal to renew the page after the start of the ejection operation.

16. An image recording apparatus according to claim 13 wherein said print data generation means generates the print data in accordance with image data sent through a line.

17. An image recording apparatus according to claim 13 wherein said recording means includes a recording head having a plurality of recording elements arranged thereon and drive means for relatively moving said recording head in a different direction than a direction of arrangement of said recording elements, and the record scan is made by the relative movement.

18. An image recording apparatus according to claim 17 wherein said recording elements record an image on the recording medium by discharging ink droplets in accordance with the print data.

19. An image recording apparatus according to claim 18 wherein said recording elements discharge ink droplets by causing status change in the ink by using thermal energy.

20. An image recording apparatus comprising:

print data generation means for generating print data;

recording means for recording an image on a recording medium in accordance with the print data generated by said print data generation means;

feed means for feeding the recording medium to a recording position of said recording means;

detection means for detecting the recording medium upstream of the recording position along a feed direction of the recording medium;

first control means for controlling said print data generation means so as to record remaining print data on a remaining area of the recording medium when it is determined at the detection of a trailing edge of the recording medium by means of said detection means that the remaining print data can be recorded on the remaining area of the recording medium; and second control means for controlling said feed means so as to renew a page and record remaining print data on a different recording medium when it is determined at the detection of a trailing edge of the recording medium by means of said detection means that the remaining print data cannot be recorded on a remaining area of the recording medium.

21. An image recording apparatus according to claim 20 wherein said print data generation means generates the print data in accordance with image data sent through a line.

22. An image recording apparatus according to claim 20 wherein said recording means includes a recording head having a plurality of recording elements arranged thereon and drive means for relatively moving said recording head in a different direction than a direction of arrangement of said recording elements, and the record scan is made by the relative movement.

23. An image recording apparatus according to claim 22 wherein said recording elements record an image on the recording medium by discharging ink droplets in accordance with the print data.

24. An image recording apparatus according to claim 23 wherein said recording elements discharge ink droplets by causing a status change in the ink by using thermal energy.

25. An image recording apparatus comprising:

print data generation means for generating print data;

recording means for recording an image on a recording medium in accordance with the print data generated by said print data generation means;

feed means for feeding the recording medium to a recording position of said recording means; and control means for controlling said print data generation means (1) so as to supply the print data to said recording means independently of a recording operation of said recording means until a predetermined record area on the recording medium reaches the recording position and (2) so as to supply the print data to said recording means in synchronism with the recording operation of said recording means after the predetermined record area on the recording medium reaches the recording position.

26. An image recording apparatus according to claim 25, wherein said control means includes count means for counting a feed amount of the recording medium by said feed means and discriminates whether or not the predetermined record area reaches the recording position in accordance with a count by said count means.

27. An image recording apparatus according to claim 25, wherein said control means supplies next print data to said recording means after the end of recording of the print data already supplied after the predetermined area on the recording medium reaches the recording position.

28. An image recording apparatus according to claim 25 wherein said print data generation means generates the print data in accordance with image data sent through a line.

29. An image recording apparatus according to claim 25 wherein said recording means includes a recording head having a plurality of recording elements arranged thereon and drive means for relatively moving said recording head in a different direction than a direction of arrangement of said recording elements, and the record scan is made by the relative movement.

30. An image recording apparatus according to claim 29 wherein said recording elements record an image on the recording medium by discharging ink droplets in accordance with the print data.

31. An image recording apparatus according to claim 30 wherein said recording elements discharge ink droplets by causing a status change in the ink by using thermal energy.

* * * * *

UNITED STATES PATENT AND TRADEMARK OFFICE
CERTIFICATE OF CORRECTION

PATENT NO. : 5,488,407
DATED : January 30, 1996
INVENTOR(S) : SHUNICHI TACHIBANA It is certified that error appears in the above-identified patent and that said Letters Patent is hereby corrected as shown below:

AT [57] ABSTRACT

Line 10, "data a" should read --data is a--.
Line 15, "unit" should read --unit.--.
Line 21, "bases" should read --based--.

SHEET 10 OF 26

FIG. 10, "WAITE" should read --WAIT--.

SHEET 11 OF 26

FIG. 11, "WAITE" should read --WAIT--.

SHEET 12 OF 26

FIG. 12, "WAITE" should read --WAIT--.

SHEET 25 OF 26

FIG. 25, "WAITE" should read --WAIT--.

SHEET 26 OF 26

FIG. 26, "WAITE" should read --WAIT--.

COLUMN 3

Line 37, "transport" should read --transports--.
Line 50, "form" should read --from--.
Line 61, "sheet 11." should read --sheet 16.--.

UNITED STATES PATENT AND TRADEMARK OFFICE
CERTIFICATE OF CORRECTION

PATENT NO. : 5,488,407
DATED : January 30, 1996
INVENTOR(S) : SHUNICHI TACHIBANA          Page 2 of 3

It is certified that error appears in the above-identified patent and that said Letters Patent is hereby corrected as shown below:

COLUMN 4

Line 6, "operation-of" should read --operation of--.

COLUMN 7

Line 42, "cont" should read --count--.
Line 61, "are" should read --is--.

COLUMN 9

Line 16, "pty" should read --the--.

COLUMN 10

Line 1, "could" should read --and could--.

COLUMN 14

Line 54, "lines." should read --line.--.

COLUMN 17

Line 15, "mounded" should read --mounted--.

UNITED STATES PATENT AND TRADEMARK OFFICE
CERTIFICATE OF CORRECTION

PATENT NO.   : 5,488,407
DATED        : January 30, 1996
INVENTOR(S)  : SHUNICHI TACHIBANA It is certified that error appears in the above-identified patent and that said Letters Patent is hereby corrected as shown below:

COLUMN 18

Line 10, "pattern" should read --predetermined pattern--.
Line 45, "reaches" should read --reaches a--.

Signed and Sealed this

Ninth Day of July, 1996

Attest:

BRUCE LEHMAN

Attesting Officer

Commissioner of Patents and Trademarks